(12) United States Patent
Koreeda

(10) Patent No.: US 8,973,081 B2
(45) Date of Patent: Mar. 3, 2015

(54) CONTENT RECEIVER AND CONTENT INFORMATION OUTPUT METHOD

(75) Inventor: Hiroyuki Koreeda, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/119,043

(22) PCT Filed: Mar. 30, 2012

(86) PCT No.: PCT/JP2012/002217
§ 371 (c)(1),
(2), (4) Date: Nov. 20, 2013

(87) PCT Pub. No.: WO2012/160743
PCT Pub. Date: Nov. 29, 2012

(65) Prior Publication Data
US 2014/0109166 A1    Apr. 17, 2014

(30) Foreign Application Priority Data

May 20, 2011  (JP) .................................. 2011-113021

(51) Int. Cl.
| H04N 7/173 | (2011.01) |
| H04N 21/433 | (2011.01) |
| H04N 21/81 | (2011.01) |
| H04N 13/00 | (2006.01) |
| H04N 21/44 | (2011.01) |
| H04N 21/434 | (2011.01) |

(52) U.S. Cl.
CPC ......... *H04N 21/4334* (2013.01); *H04N 21/816* (2013.01); *H04N 13/0059* (2013.01); *H04N 13/0066* (2013.01); *H04N 13/0055* (2013.01); *H04N 21/44* (2013.01); *H04N 21/4345* (2013.01)
USPC ........... 725/134; 725/131; 725/133; 725/139; 725/141; 725/142; 348/42

(58) Field of Classification Search
USPC ......... 725/100, 131, 133–134, 139, 141, 142; 348/42
See application file for complete search history.

(56) References Cited

U.S. PATENT DOCUMENTS

| 2010/0329640 | A1* | 12/2010 | Okada et al. ................. 386/252 |
| 2011/0099285 | A1* | 4/2011 | Yamagishi et al. .......... 709/231 |
| 2011/0273541 | A1* | 11/2011 | Kitazato ........................ 348/51 |
| 2012/0113218 | A1 | 5/2012 | Sasamoto et al. |
| 2012/0120204 | A1 | 5/2012 | Ohno et al. |

FOREIGN PATENT DOCUMENTS

| JP | 2010-113607 A | 5/2010 |
| JP | 2011-082666 A | 4/2011 |
| JP | 2011-097227 A | 5/2011 |
| WO | 2004/100549 A1 | 11/2004 |
| WO | 2011/043213 A1 | 4/2011 |
| WO | 2011/052289 A1 | 5/2011 |

* cited by examiner

*Primary Examiner* — Mulugeta Mengesha
(74) *Attorney, Agent, or Firm* — Baker Botts L.L.P

(57) ABSTRACT

In a receiver for downloading video content including 3D video and outputting the downloaded video content to a removable medium, information concerning 3D video is made usable also by the removable medium.

A content receiver includes a download control unit for receiving, via a network, video content and reproduction control information for use in reproducing and outputting, to outside, the video content and an output control unit for exporting the received video content to an external medium. In the content receiver, when outputting the video content to an external medium, the output control unit records, based on first 3D video information delivered being included in the reproduction control information and indicating a state of 3D video existence in the video content, second 3D video information indicating whether the video content includes 3D video in management information of the external medium for recording the video content.

6 Claims, 36 Drawing Sheets

Figure 12:
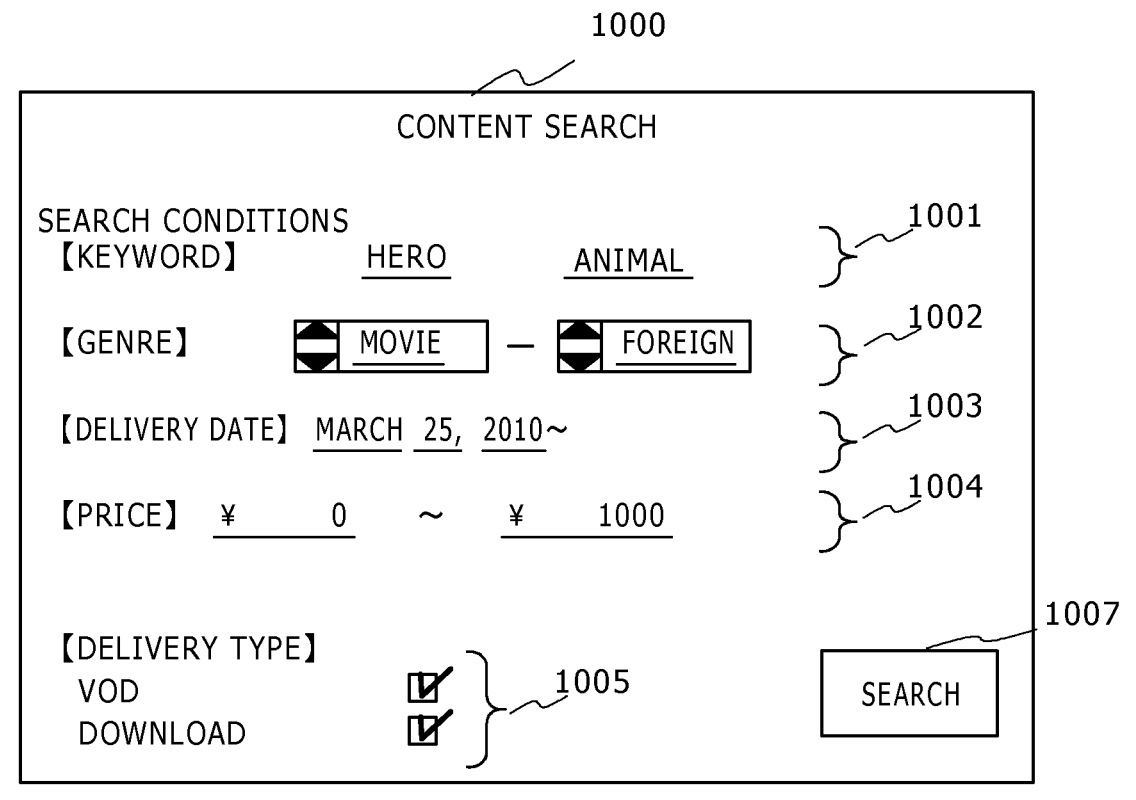

CONTENT SEARCH

SEARCH CONDITIONS
【KEYWORD】 HERO    ANIMAL  } 1001

【GENRE】 MOVIE — FOREIGN } 1002

【DELIVERY DATE】 MARCH 25, 2010~ } 1003

【PRICE】 ¥ 0 ~ ¥ 1000 } 1004

【DELIVERY TYPE】
VOD ☑
DOWNLOAD ☑ } 1005

SEARCH — 1007

FIG.13

SEARCH RESULT

| 【TITLE】 | 【DELIVERY】 | 【PURCHASE STATE】 | 【OPERATION】 | | |
|---|---|---|---|---|---|
| MOVIE 1 | VOD/DL | PURCHASED | DETAILS | | DL VIEWING |
| MOVIE 2 | VOD/DL | PURCHASED | DETAILS | VOD VIEWING | DL VIEWING |
| MOVIE 3 | VOD | NOT PURCHASED | PURCHASE | | |
| MOVIE 4 | VOD | FREE OF CHARGE | DETAILS | VOD VIEWING | |
| MOVIE 5 | VOD/DL | PURCHASED | DETAILS | | DL IN PROGRESS |
| MOVIE 6 | DL | NOT PURCHASED | PURCHASE | | |
| MOVIE 7 | VOD/DL | PURCHASED | DETAILS | VOD VIEWING | DL NOT STARTED |
| MOVIE 8 | VOD/DL | NOT PURCHASED | PURCHASE | | |
| : | : | : | : | : | : |

| | 【TITLE】 | 【DL STATE】 | 【PURCHASE STATE】 | 【OPERATION】 | | |
|---|---|---|---|---|---|---|
| | MOVIE 1 | DL COMPLETED | PURCHASED | DETAILS | VIEW | EXPORT |
| | MOVIE 2 | DL IN PROGRESS (30%) | PURCHASED | DETAILS | VIEW | EXPORT |
| | MOVIE 3 | DL NOT STARTED | NOT PURCHASED | PURCHASE | VIEW | EXPORT |
| | MOVIE 4 | DL COMPLETED | FREE OF CHARGE | DETAILS | VIEW | |
| | MOVIE 5 | DL ERROR | PURCHASED | DETAILS | VIEW | EXPORT |
| | MOVIE 6 | DL COMPLETED | NOT PURCHASED | PURCHASE | VIEW | EXPORT |
| | MOVIE 7 | DL COMPLETED | PURCHASED | DETAILS | VIEW | EXPORT |
| | MOVIE 8 | DL COMPLETED | NOT PURCHASED | PURCHASE | | EXPORT |

LOCAL NAVIGATION (1600), 1601, 1602, 1603, 1604, 1605, 1606

CONTENT RECEIVER AND CONTENT INFORMATION OUTPUT METHOD

TECHNICAL FIELD

The present invention relates to a receiver for receiving, via a network, 3D video content delivered from a delivery system and a receiving method thereof and also relates to a content delivery method used in a content transmitting and receiving system including a delivery system and a receiver.

BACKGROUND ART

A background art in the present technical field is described in International Publication No. WO2004/100549 (Patent Literature 1). In Patent Literature 1, an embodiment of a delivery system including a server for delivering content and a receiver for downloading, via the Internet, content from the server and reproducing the content is described.

In the embodiment, an Internet browser obtains a download control file (referred to, in the present invention, as a download control metafile) describing execution of a content download from a server, then a download agent interprets the download control file and executes content downloading.

CITATION LIST

Patent Literature

Patent Literature 1: International Publication No. WO2004/100549.

SUMMARY OF INVENTION

Technical Problem

An object of the present invention is to make, in a receiver for downloading video content including 3D video and outputting the video content to a removable medium, information related with 3D video usable also by a removable medium.

Solution to Problem

To achieve the above object, for example, a configuration according to the claims of the present invention is adopted.

The present application discloses plural means for achieving the above object. For example, the above object can be achieved by a content receiver which includes a download control unit for receiving, via a network, video content and reproduction control information for use in reproducing and outputting, to outside, the video content and an output control unit for outputting the received video content to an external medium and in which, when outputting the video content to an external medium, the output control unit records, based on 3D video information delivered being included in the reproduction control information and indicating a state of 3D video existence in the video content, 3D video information indicating whether the video content includes 3D video in management information of the external medium for recording the video content.

Advantageous Effects of Invention

According to the present invention, when, in a video content receiver, delivered video content including 3D video is outputted to an external medium, whether the video content exported to the external medium includes 3D video can be determined.

BRIEF DESCRIPTION OF DRAWINGS

FIG. 12 shows an example of content search screen of a receiver.
FIG. 13 shows an example of search result screen of a receiver.
FIG. 19 shows an example of local navigation screen of a receiver.

DESCRIPTION OF EMBODIMENTS

In the following, embodiments will be described with reference to drawings.

First Embodiment

In the present embodiment, examples of a content receiver 50 and a delivery system 60 will be described.

Figure 1:
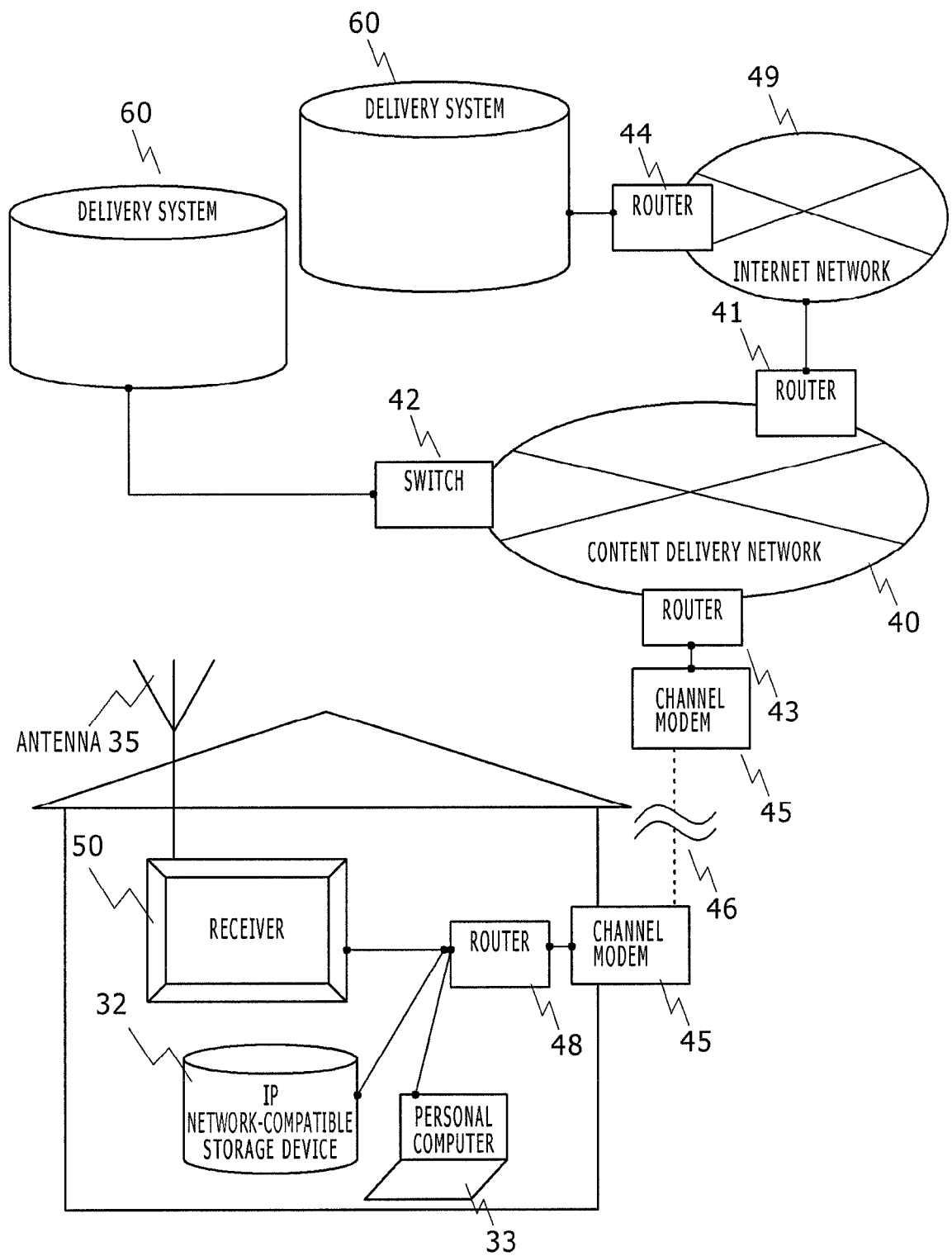
FIG. 1 shows an example configuration of a content transmitting and receiving system.

FIG. 1 shows an example configuration of a content transmitting and receiving system to which the present embodiment is applied. Its networks include a content delivery network 40 which, in the network, ensures network quality and is connected, via a router 43, to homes and an external Internet network 49 accessed from the content delivery network 40. A delivery system 60 is connected to the content delivery network 40 via a network switch 42 or, with importance attached to versatility, to the Internet network 49 via a router 44.

A communication path 46 for network connection to a home may use, for example, a coaxial cable, optical fiber, ADSL (Asymmetric Digital Subscriber Line), or wireless communication. For conversion into an IP network, a channel modem 45 performs modulation/demodulation corresponding to the type of the communication path 46.

In the home, the IP network resulting from demodulation and conversion into a network interface by the channel modem 46 is connected to home devices via a router 48.

The home devices may include a receiver 50, a network-attached storage compatible with IP network 32, a personal computer 33, and an A/V device connectable to a network. The receiver 50 may be capable of reproducing and accumulating broadcasts received via an antenna 35.

Figure 2:
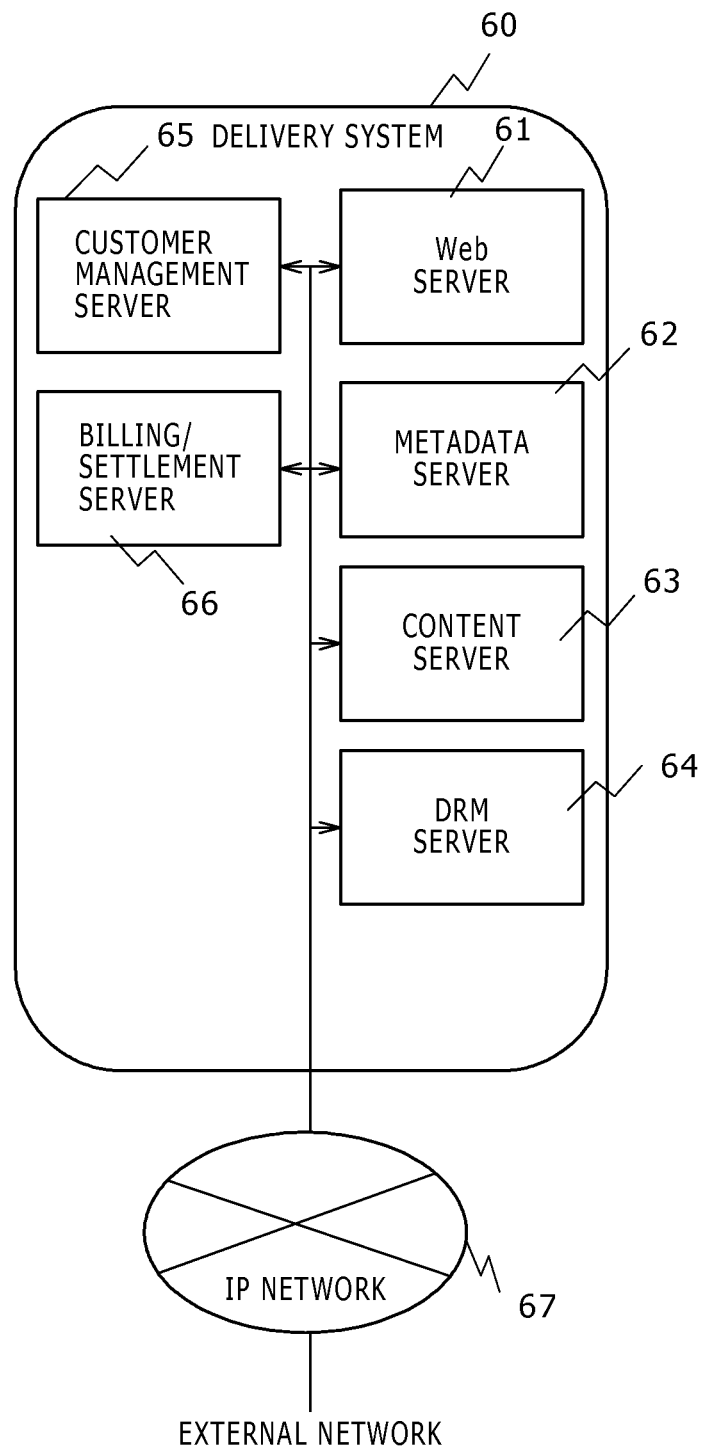
FIG. 2 shows an example configuration of a delivery system.

FIG. 2 shows an example configuration of the content delivery system 60.

The content delivery system 60 includes a web server 61 for delivering a web document 71, ECG metadata 400 describing attribute information about content to be delivered, a metadata server 62 for delivering reproduction control information 200 describing information required to reproduce content, a content server 63 for delivering a content body 75, a DRM server 64 for delivering a license 300 which includes information about the right to use content and a key required to decrypt the content to be used, a customer management server 65 for managing customer information associated with a delivery service, and a billing/settlement server 66 for processing billing and settlement for content used by customers.

These servers are, while being interconnected by an IP network 67, connected to the Internet network 49 or the content delivery network 40 shown in FIG. 1 via the IP network 67.

An alternative configuration may be used in which some or all of the above servers are directly connected, without involving the IP network 67, to the Internet network 49 or the content delivery network 40 for mutual communications.

The servers described above as included in the delivery system 60 are exemplary models. In reality, a delivery system may include a server integrating plural types of servers or it may not have some of the above servers. Also, a server, like the metadata server 62, used to deliver plural types of data may be divided into plural servers corresponding to the data types. The respective servers are interconnected by a network like the Internet.

Figure 3:
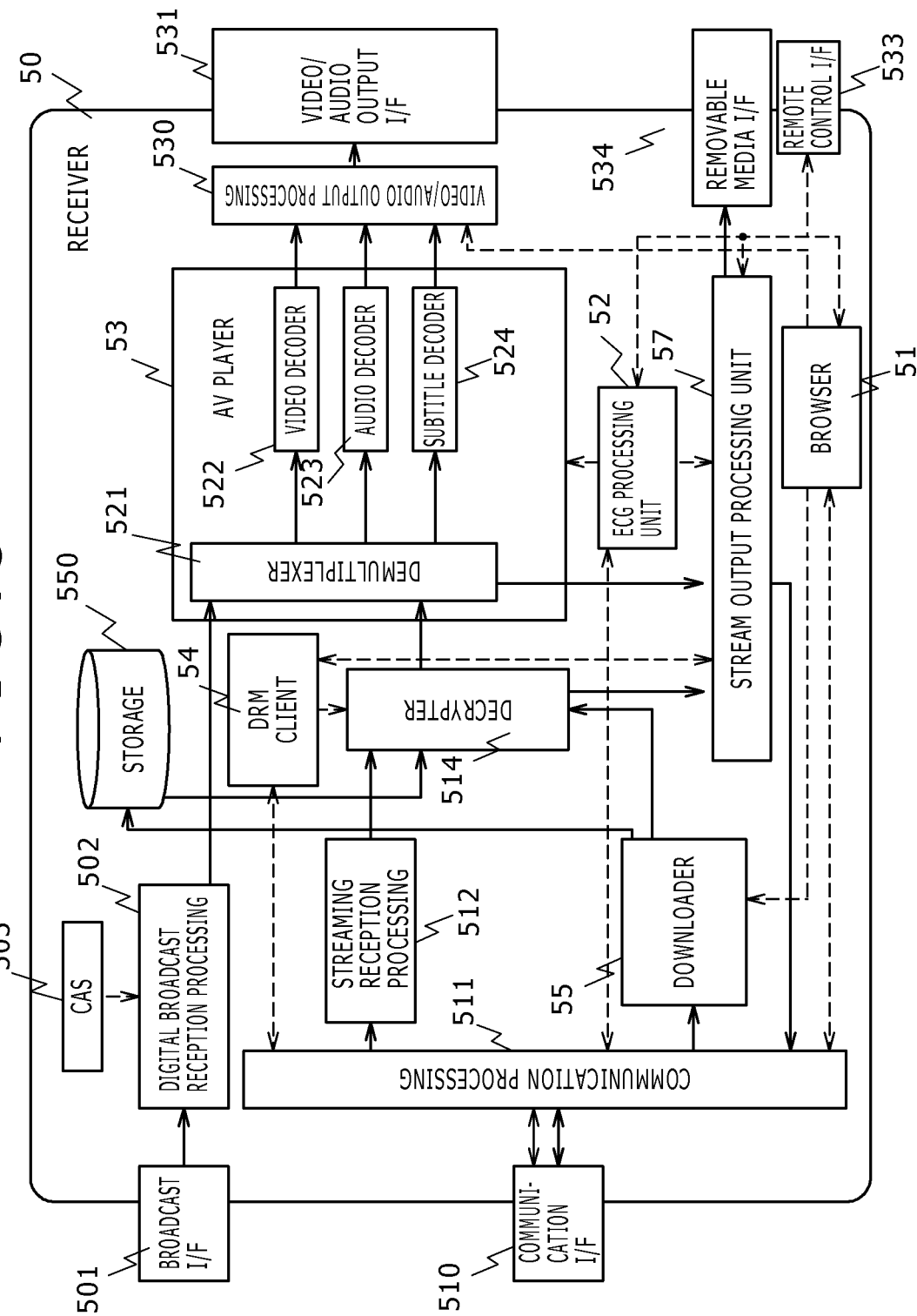
FIG. 3 shows an example configuration of a receiver.

FIG. 3 shows an example configuration of the receiver 50.

The receiver 50 is capable of reproducing received content or outputting received content to a removable medium or a network. Also, it has a storage 550 for accumulating received content. In FIG. 3, solid arrows represent content flows, and dashed arrows represent control flows.

The receiver 50 includes a communication IF (Interface) 510 which physically connects to an IP network and transmits/receives IP (Internet Protocol) data packets and a communication processing unit 511 which processes, via the communication I/F 510, various IP communication protocols such as TCP (Transmission Control Protocol), UDP (User Datagram Protocol), DHCP (Dynamic Host Configuration Protocol), DNS (domain name server), and HTTP (Hyper Text Transfer Protocol).

A downloader 55 is a processing unit which performs processing for obtaining content and information about content. A DRM client 54 manages content copyright and controls, based on content purchase conditions, viewing and copying of content. A decrypter 514 decrypts content to be downloaded in accordance with an instruction from the DRM client 54. A stream output processing unit 57 outputs content to a removable medium 560 connected to the receiver 50, or it outputs content to a network-connected device 570 via the communication processing unit 511 and the communication I/F 510.

The removable medium 560 is a removable storage medium which can be accessed via a removable media I/F 534 connected to a stream output processing unit 57.

The receiver 50 is provided with a remote control I/F 533 and is operated in accordance with remote control signals received from the user via the remote control I/F 533.

The receiver 50 possibly has a function to receive a streaming delivery service for video/audio content on an on-demand basis. In such a case, the receiver 50 is provided with a streaming reception processing unit 512 for real-time reception of video/audio content via the communication processing unit 511.

An AV player 53 decodes content such as downloaded content, content received by streaming delivery, or broadcast content received for conversion into video and audio signals.

The AV player 53 internally has a demultiplexer 521 which separates content decrypted at the decrypter 514 into video, audio, and subtitle packets and sends out the respective packets to a video decoder 522, an audio decoder 523, and a subtitle decoder 524, respectively. These decoders decode video, audio, and subtitle information, and the decoded information is converted into an integrated video/audio signal by a video/audio output processing unit 530. The video/audio signal is outputted from the receiver 50 via a video/audio output I/F 531.

Thus, the user can view video/audio content, for example, on a TV set connected to the video/audio output I/F 531.

The video/audio output processing unit 530 and the video/audio output I/F 531 may be interfaced based on the HDMI (registered trademark) standard for integrally processing and outputting a video/audio signal. Or, depending on the case, they may process video and audio independently to output a composite video signal and an analog audio signal.

Furthermore, there may be cases in which the receiver can also receive and record digital broadcasts. In such cases, the receiver 50 is provided with a broadcast I/F 501 which inputs a broadcast wave, a digital broadcast reception processing unit 502 which decodes a digital broadcast signal for conversion into a video/audio stream, and a CAS (Conditional Access System) 503 which performs copyright protection when a digital broadcast signal is decoded.

In the receiver 50, downloaded content be outputted directly to the stream output processing unit 57 to have the content outputted to the removable medium 560.

It is also possible for the receiver 50 to once store the downloaded content in the storage 550. In such a case, by subsequent operation of the receiver, the content stored can be outputted from the storage 550 to, for example, the removable medium 560.

Even with the storage 550 provided, content received may be exported either without once storing the content in the storage 550 or after once storing the content in the storage 550.

In this case, even when the receiver has the storage 550 that may be a HDD, the downloaded content can be exported to the removable medium 560 via the stream output processing unit 57. This makes it unnecessary to store the content in the storage 550. An advantage of this case is that content can be downloaded even when an adequate storage capacity is not available for recording.

When the receiver 50 shown in FIG. 3 is to provide only a service for exporting content directly to the removable medium 560 without involving the storage 550, the receiver can be made less expensive having no storage 550.

Also, it is possible to once store downloaded content as it is in the storage 550 without decrypting it and to subsequently have the content stored in the storage 550 decrypted by the decrypter 514 when reproducing the content or exporting the content to, for example, the removable medium 560. In this case, the DRM client 54 obtains the license 300 from the DRM server 64, then the decrypter 514 decrypts the content based on a content key 311 written in the license 300.

When reproducing content, the decrypter 514 decrypts the content, and the demultiplexer 521 separates the decrypted content into video, audio, and subtitle data packets. The video decoder 522, audio decoder 523, and subtitle decoder 524 decode the separated video, audio, and subtitle data packets, respectively. The video/audio output processing unit 530 outputs the decoded video/audio signal to outside via the video/audio output I/F 531. The above processing enables the user to view the content.

When exporting content, the decrypter 514 decrypts the content, and the stream output processing unit 57 outputs the decrypted content to, for example, the removable medium 560.

Referring to FIG. 3, it is possible to realize by hardware all or part of the digital broadcast reception processing unit 502, the CAS 503, the communication processing unit 511, the streaming reception processing unit 512, the decrypter 514, the demultiplexer 521, the video decoder 522, the audio decoder 523, the subtitle decoder 524, the video/audio output processing unit 530, a browser 51, the ECG processing unit 52, the AV player 53, the DRM client 54, the downloader 55, and the stream output processing unit 57, for example, by forming them, as the respective processing units, into an integrated circuit.

Also, all or part of the processing can be realized by software by processing such programs as a digital broadcast reception processing program 502, a CAS program 503, a communication processing program 511, a streaming reception processing program 512, a decrypter program 514, a demultiplexer program 521, a video decoder program 522, an audio decoder program 523, a subtitle decoder program 524, a video/audio output processing program 530, the storage 550, a browser program 51, an ECG processing program 52, an AV player program 53, a DRM client program 54, a downloader program 55, and a stream output processing program 57 stored in a storage device, for example, the storage 550 or a memory, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

Next, data exchanges performed between the receiver 50 included in the system configuration shown in FIG. 3 and the content delivery system 60 shown in FIG. 2 will be described with reference to FIGS. 4, 5, and 6. Even though, in FIGS. 4, 5, and 6, the receiver is shown having only those blocks relevant to the processing being described out of the blocks included in the receiver 50 shown in FIG. 3, the receiver shown in each of FIGS. 4, 5, and 6 may include other processing units included in the receiver 50 shown in FIG. 3. Also, the receivers shown in FIGS. 4, 5, and 6 need not necessarily have all the units shown. Some of the units may be omitted.

Figure 4:
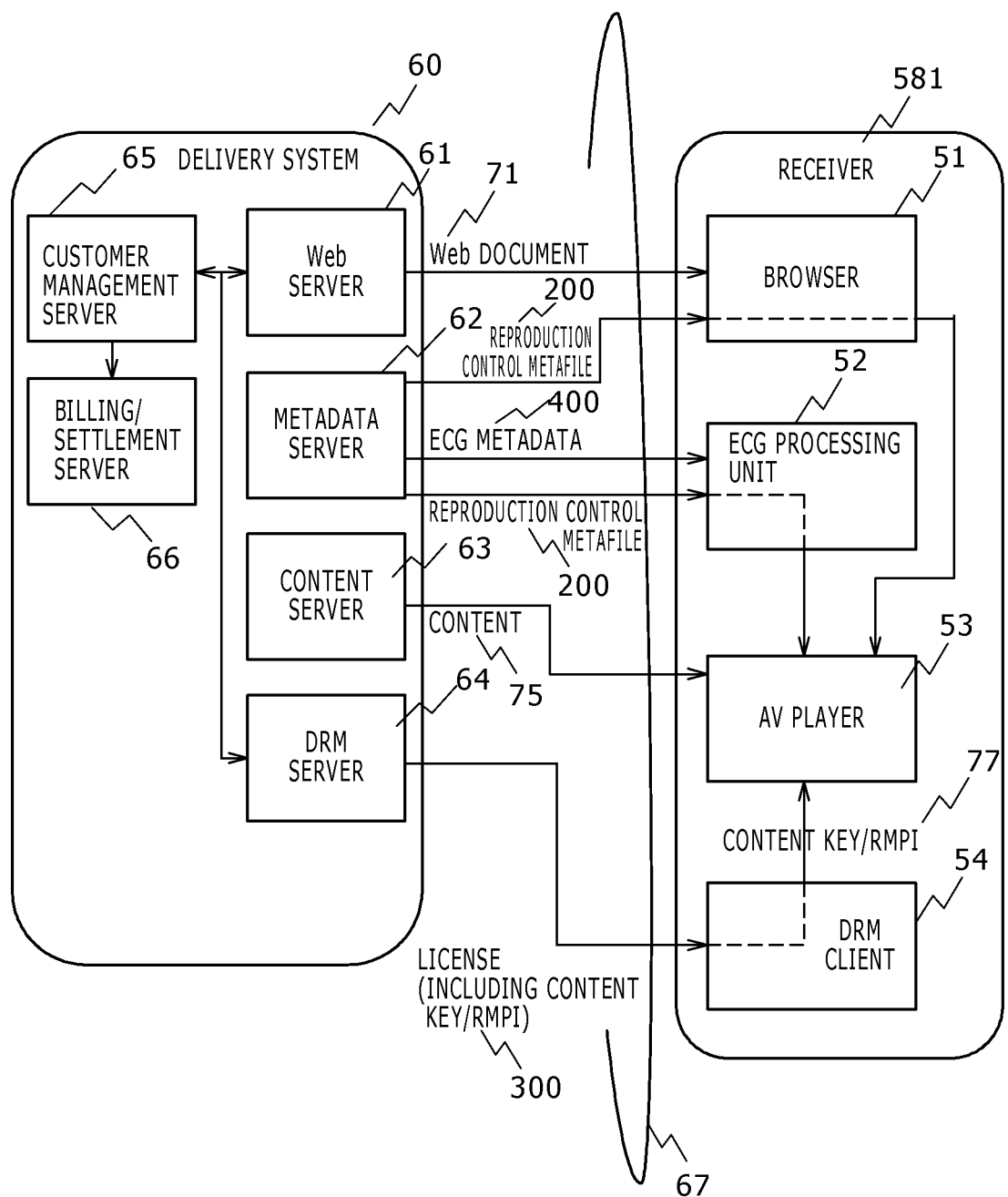
FIG. 4 shows a first example of relationship between a receiver and a delivery system.

A receiver 581 shown in FIG. 4 is a subset of the receiver 50 shown in FIG. 3 configured by extracting blocks used for data transfers between the receiver 50 and a streaming delivery system.

The content delivery system 60 includes the web server 61 for delivering a web document 71, the ECG metadata 400 describing attribute information about content to be delivered, the metadata server 62 for delivering a reproduction control metafile 200 describing information required for content reproduction, the content server 63 for delivering a content body 75, the DRM server 64 for delivering a license 300 including information about the right to use content and a key required to decrypt the content to be used, the customer management server 65 for managing customer information associated with a delivery service, and the billing/settlement server 66 for processing billing and settlement for content used by customers.

The IP network 67 used to transfer the above data between the receiver 581 and the delivery system 60 is assumed to be the delivery network shown in FIG. 1.

In the case illustrated in FIG. 4, the browser 51, by being controlled using an operating device such as a remote controller, presents the web document 71 received from the web server 61 and searches for and finds the content 75 the user wishes to view. An alternative method may be used in which the ECG (Electric Content Guide) processing unit 52 provided as a receiver application presents the ECG metadata 400 obtained from the metadata server 62 to the user in the form of an ECG allowing the user to search for the content 75 the user wishes to view based on the presented ECG.

When the user selects content he or she wishes to view and instructs, on the web document 71, reproduction of the content, the browser 51 obtains, based on the reference destination written in the web document 71, the reproduction control metafile 200 from the metadata server 62 and instructs the AV player 53 to reproduce the content. Alternatively, on the ECG displayed by the ECG processing unit 52, the user instructs reproduction of the content causing the ECG processing unit 52 to obtain, based on the reference destination written in the ECG metadata 400, the reproduction control metafile 200 from the metadata server 62 and gives a reproduction request to the AV player 53.

The AV player 53 obtains, in accordance with the contents of the reproduction control metafile 200, the content key and signal output restriction/copy control information referred to as RMPI (Right Management and Protection Information) from the DRM client 54; sets the content key in the decrypter 514; sets video/audio output conditions in the video/audio output I/F 531 in accordance with RMPI; and carries out streaming reproduction of the content 75 delivered from the content server 63.

The DRM client 54 holds the effective licenses 300 and, when a request is received from the AV player 53 or the stream output processing unit 57, provides the content key and RMPI contained in the corresponding license 300. When a license 300 requested has not been obtained, a license 300 required to reproduce the content is obtained from the DRM server 64.

Figure 5:
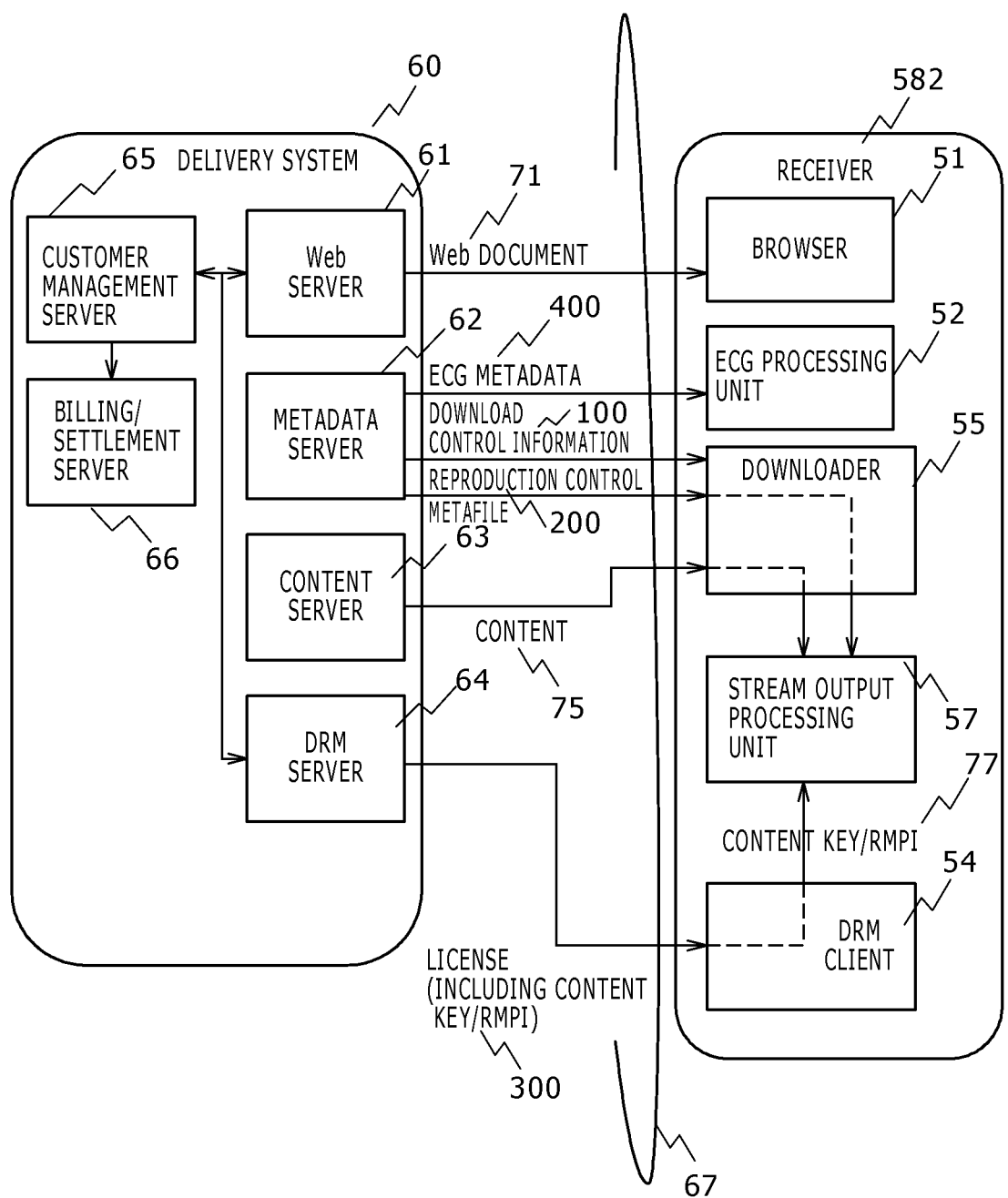
FIG. 5 shows a second example of relationship between a receiver and a delivery system.

A receiver 582 shown in FIG. 5 is a subset of the receiver 50 shown in FIG. 3 configured by extracting blocks used for data transfers between the receiver 50 and a download delivery system.

In the case illustrated in FIG. 5, too, the browser 51 presents the web document 71 received from the web server 61 and, by being controlled using an operating device such as a remote controller, searches for and finds the content 75 the user wishes to view. Alternatively, the ECG processing unit 52 provided as a receiver application may present the ECG metadata 400 obtained from the metadata server 62 to the user in the form of an ECG allowing the user to search for the content 75 the user wishes to view based on the ECG.

When the user selects the content he or she wishes to view and instructs, on the web document 71, downloading of the content, the browser 51 obtains, based on the reference destination described in the web document 71, the download control information 100 from the metadata server 62 and instructs the downloader 55 to download the content. Alternatively, on the ECG displayed by the ECG processing unit 52, the user instructs downloading of the content causing the ECG processing unit 52 to obtain, based on the reference destination described in the ECG metadata 400, the download control information 100 from the metadata server 62 and give a download request to the downloader 55.

The downloader 55 obtains the reproduction control metafile 200; obtains, in accordance with the contents of the reproduction control metafile 200, the content key and signal output restriction/copy control information referred to as RMPI (Right Management and Protection Information) contained in the license 300 for the content from the DRM client 54; sets the content key in the decrypter 514; sets, in accordance with RMPI, video/audio output conditions in a removable medium 560 and a network-connected device 570 provided at the export destination; requests the content server 63 for the content 75 identified by the URL included in the download control information 100 and indicating the content location 156; downloads the content 75 delivered by the content server 63; outputs the content after being decrypted by the decrypter 514 to the stream output processing unit 57; and performs export processing. When downloading the content 75, the stream reproduction control information 710 may also be downloaded for use as reference information when outputting the content 75 to the stream output processing unit 57.

Figure 6:
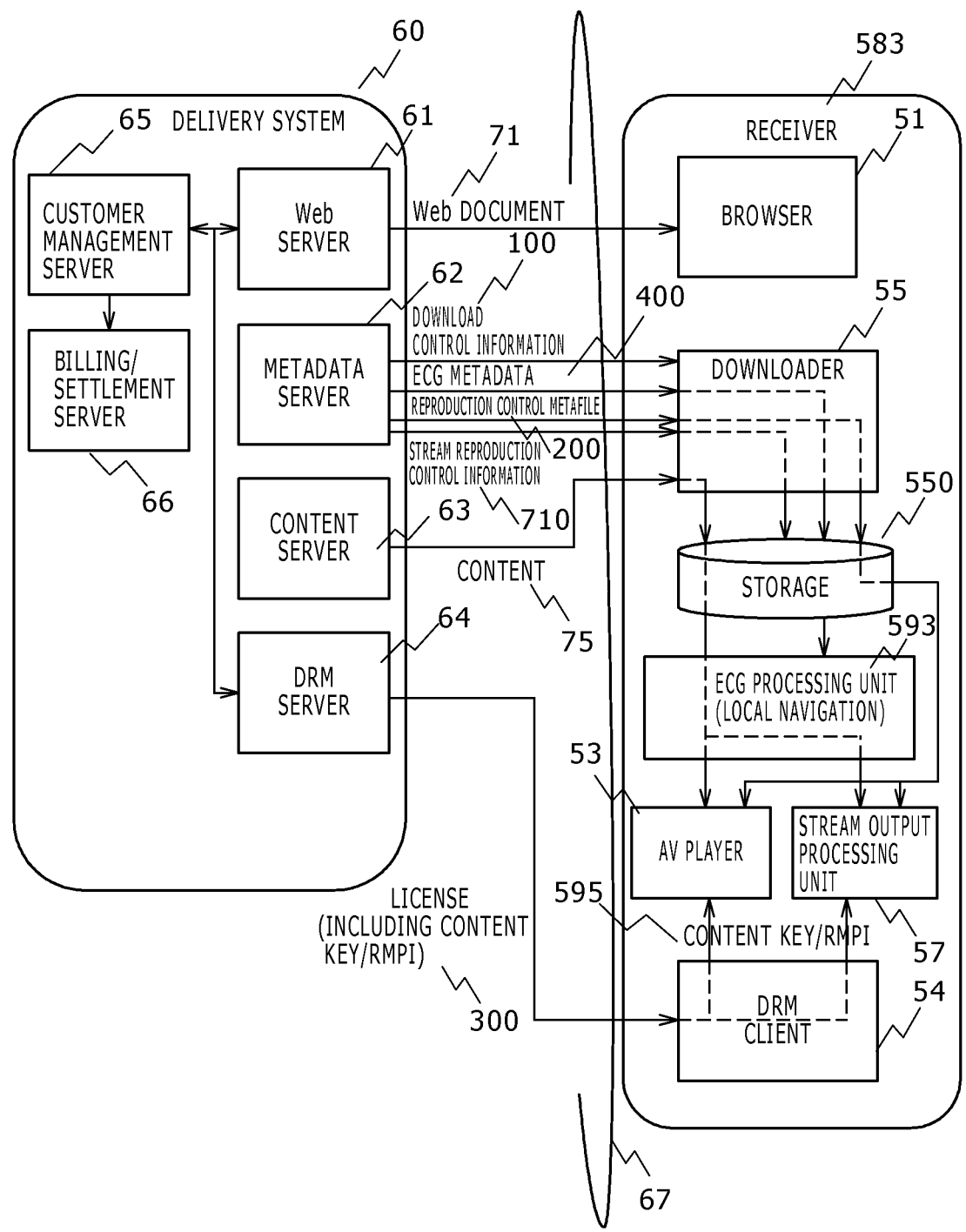
FIG. 6 shows a third example of relationship between a receiver and a delivery system.

FIG. 6 shows a receiver 583 configured by extracting blocks used for data transfers made, via the storage 550, between the receiver 50 shown in FIG. 3 and a download delivery system.

In the case illustrated in FIG. 6, the browser 51 presents the web document 71 received from the web server 61 and, by being controlled using an operating device such as a remote controller, searches for and finds the content 75 the user wishes to view. Alternatively, as shown in FIG. 5, though not shown in FIG. 6, the ECG processing unit 52 provided as a receiver application may present the ECG metadata 400 obtained from the metadata server 62 allowing the user to search for the content 75 he or she wishes to view.

When content selection is received from the user and the user instructs, on the web document 71, downloading of the selected content, the browser 51 obtains, based on the reference destination described in the web document 71, the download control information 100 from the metadata server 62 and requests the downloader 55 to download the content.

The downloader 55 obtains the content 75 and the ECG metadata 400, reproduction control metafile 200, and stream reproduction control information 710 associated with the content 75, and stores them in the storage 550.

The content 75 thus stored can be searched for and selected by the ECG processing unit 52 of the receiver to be then reproduced or exported.

When content reproduction is instructed, the ECG processing unit 52 activates the AV player 53 and requests reproducing the content. When content export is instructed, the ECG processing unit 52 activates the stream output processing unit 57 and requests export processing.

Next, the contents of information processed by the receiver will be described in detail.

Figure 7:
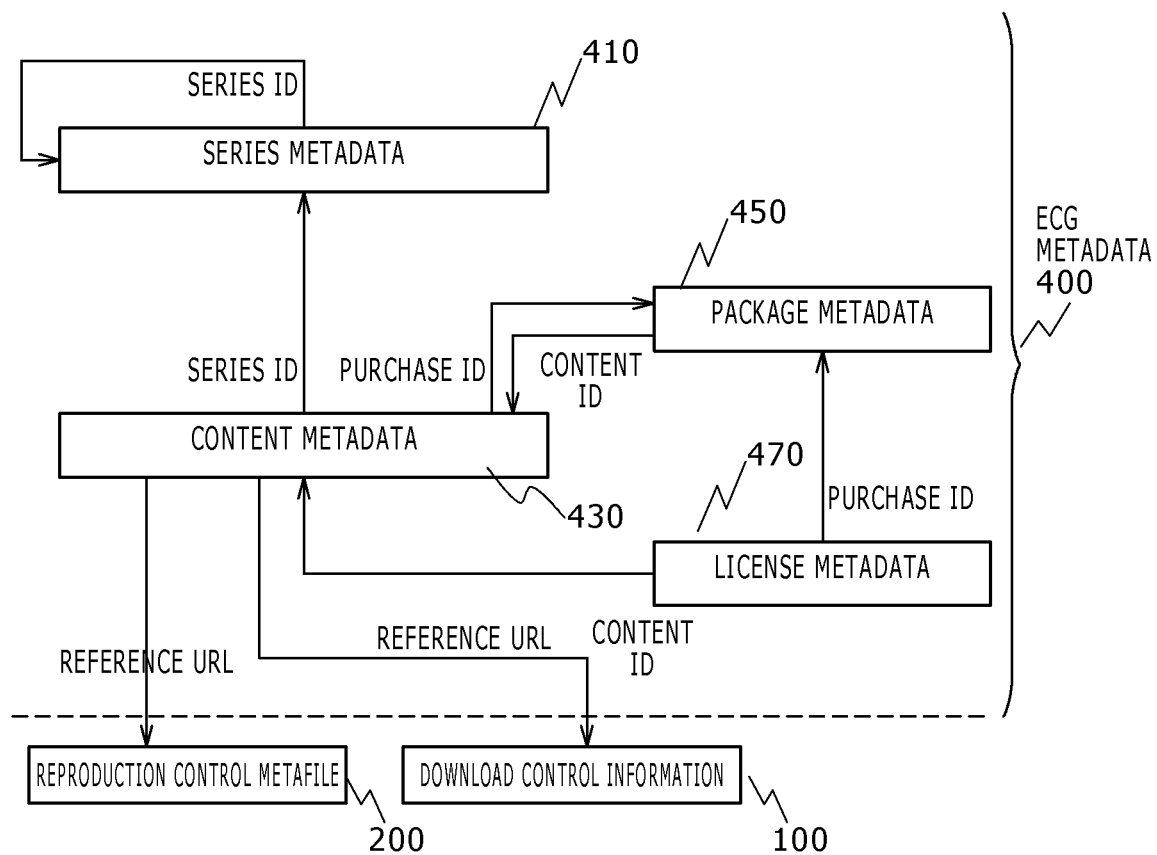
FIG. 7 shows ECG metadata correlations.

FIG. 7 shows data correlations within the ECG metadata 400 that the ECG processing unit 52 presents as an ECG for content searching. The ECG metadata 400 is represented in XML format.

The ECG metadata 400 includes content metadata 430 describing attribute information about individual programs to be delivered, for example, program names, description, video, audio, and genres, series metadata 410 managing individual programs in series-based groups to facilitate program searching, license metadata 470 describing program purchase licenses, and package metadata 450 describing purchase conditions for individual programs or program groups. The content metadata 430 may include group IDs which can uniquely identify respective series metadata 410 to which specific programs belong. With the respective series metadata 410 including group IDs corresponding to them, a hierarchical group configuration can be defined.

The license metadata 470 about a license includes a content ID uniquely identifying the content metadata 430 for the program that can be used with the license and a purchase ID uniquely identifying the package metadata 450 that can be used as purchase conditions. The content metadata 430 and the package metadata 450 have the purchase IDs and the content IDs mutually corresponding between them. The content metadata 430 may have, in cases where the content can be stream-reproduced and/or can be downloaded, reference information for obtaining the reproduction control information 200 used for streaming reproduction and the download control information 100 used for content downloading.

Figure 8:
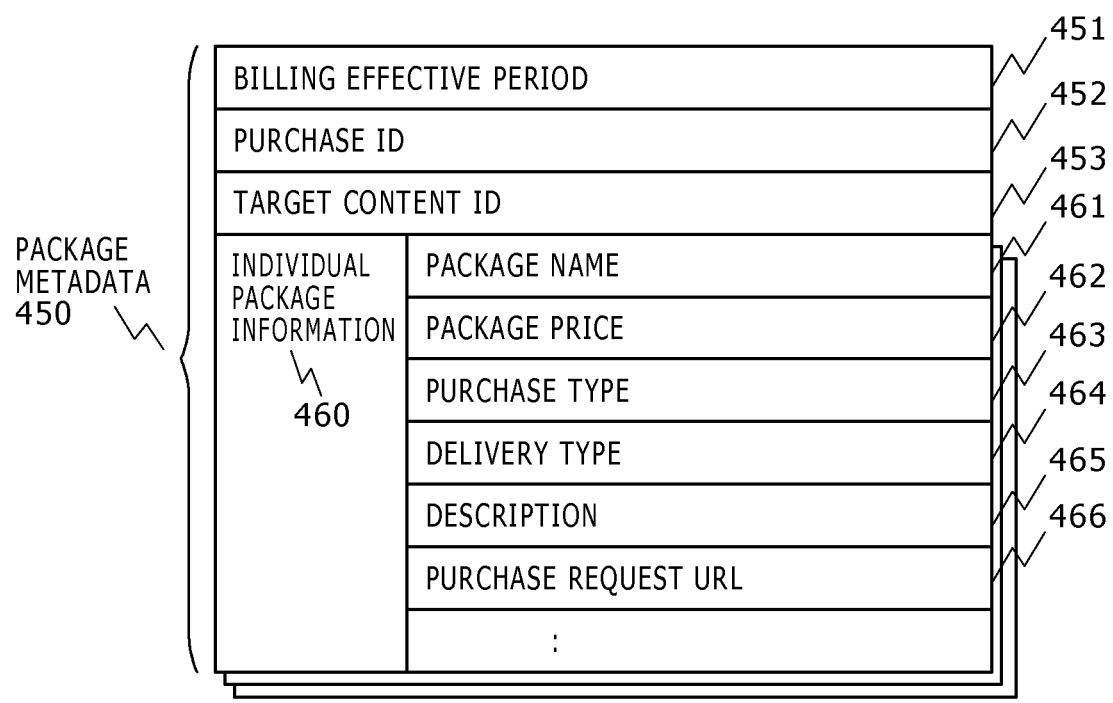
FIG. 8 shows an example of composition of package metadata.

FIG. 8 shows an example of composition of the package metadata 450 included in the ECG metadata 400.

The package metadata 450 holds a billing effective period 451 describing a billing starting date and a billing ending date, a purchase ID 452 uniquely identifying the package metadata 450, and a target content ID 453 identifying the content to be the object of purchase based on the package metadata 450.

The package metadata 450 allows plural packages to be described therein and has the following information about each package.

A package name 461, package price 462, and description 465 provide information to be presented to the user to describe the package. A purchase type 463 identifies a type of package purchase, i.e. whether the purchase is for individual content or for a series of content, or whether the purchase is based on a monthly contract. A delivery type 464 identifies the type of content delivery, i.e. whether the delivery is a streaming delivery or a download delivery or both.

A purchase request URL 466 describes an access destination for the server to be accessed when requesting a purchase transaction based on a purchase operation made by the user.

Namely, the ECG processing unit 52 displays a search screen by referring to the content metadata 430 or the series metadata 410 and, when content to be used is selected, presents the purchase conditions for the content to the user by referring to the license metadata 470 for the content, allowing the user to perform purchase operation based on the package metadata 450. When streaming reproduction of content is instructed on the ECG presented by the ECG processing unit 52, the ECG processing unit 52 obtains the reproduction control information 200 based on the URL information described in the content metadata 430, then the AV player 53 carries out streaming reproduction in accordance with the contents of description in the reproduction control information 200.

When content downloading is instructed on the ECG presented by the ECG processing unit 52, the ECG processing unit 52 obtains the download control information 100 based on the URL information described in the content metadata 430, then the downloader 55 downloads the content in accordance with the contents of description in the download control information 100.

Figure 9:
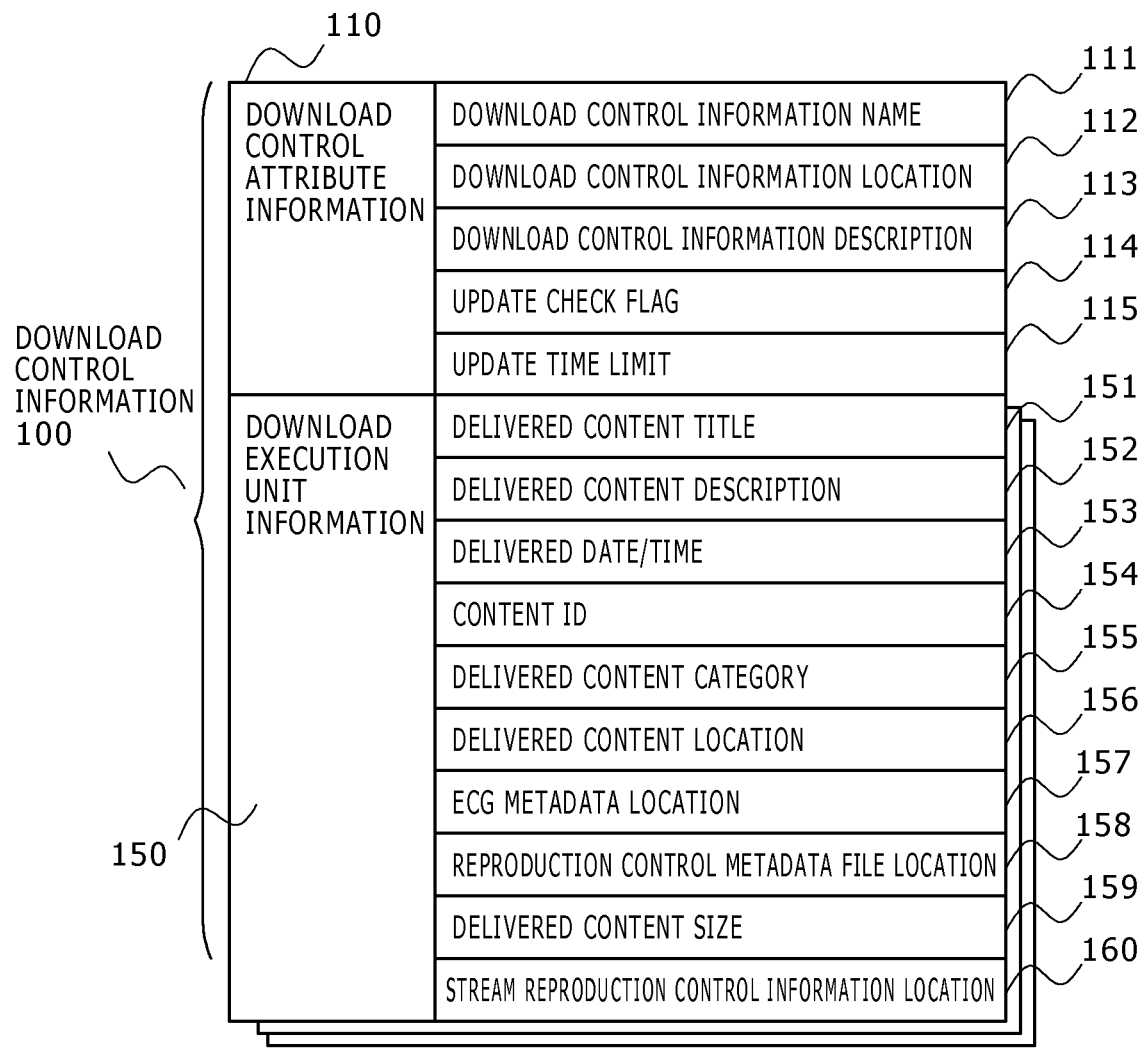
FIG. 9 shows an example of composition of download control information.

FIG. 9 shows an example of composition of the download control information 100. The download control information 100 includes download control attribute information 110 describing the contents of the metafile itself and download execution unit information 150 used when downloading single or plural content. The download control information 100 is described, for example, in RSS (RDF Site Summary or Really Simple Syndication). The download control information can be generated (prepared) for plural optional pieces of content included in a package, but it cannot range over plural packages.

It is also possible to prepare plural sets of download control information for a single package. Every one of such plural sets of download control information should be prepared to allow all content included in the package to be downloaded. The download control information 100 is subject to updating, so that the receiver makes periodic checks so as to reflect such updating. In the case of RSS, each content is uniquely identified by "enclosure url".

The download control information 100 includes such information as download control information name 111 indicating the names of the corresponding download control information 100 (e.g. name of download reservation, file name, and ID), download control information location 112 indicating the location of the corresponding download control information 100 (This is represented, for example, by the URL of an Internet website where download reservation can be made, but need not necessarily be a URL and may be an address of a different type. This also applies to other information locations.), download control information description 113 describing the corresponding download control information 100 (e.g. description of download reservation and language type), update check flag 114, and update time limit 115.

The update check flag 114 is a flag for determining whether to make checking periodically to see if the download control information 100 on the metadata server 62 has been updated. It assumes a value either "update" indicating that periodic checking is made or a value "one shot" indicating that, after the download control information 100 is initially obtained, no periodic checking is made. The update time limit 115 is effective when the update check flag 114 is in a state of "update". In this case, whether the download control information 100 has been updated is periodically checked until the time limit is reached.

The update time limit 115 indicates a time limit for checking for a content update. The time limit may be set in an optional unit (e.g. in days, in hours, or in minutes). It may assume a value "no time limit" to have checking for a content update continued semi-permanently. Also, an alternative method may be adopted in which a special value (e.g. all 0s) of the update time limit 115 is treated as equivalent to the update check flag 114 in a state of "one shot" and the update check flag 114 is omitted.

Plural sets of the download execution unit information 150 can be entered in the download control information 100. The download execution unit information 150 about content to be downloaded includes such information as: delivered content title 151 indicating the title of content (may be a program title, a file name, or an ID), delivered content description 152 describing the content (e.g. features and remarks), delivery time 153 indicating the content delivery date/time (may be specified in days or in minutes), delivered content ID 154 uniquely identifying the content on the Internet, delivered content category 155, content location 156 indicating the URL where the delivered content can be obtained, ECG metadata location 157 indicating the URL where the ECG metadata corresponding to the content can be obtained, reproduction control information location 158 indicating the URL where the reproduction control metafile corresponding to the content can be obtained, delivered content size 159, and stream reproduction control information location 160 indicating the URL where the stream reproduction control metafile 710 providing content picture reproduction location information can be obtained.

The content ID identifier 154 is described, for example, by character string "CRID://authority/content_id" based on schema. In the character string, "authority" represents a keyword for uniquely identifying the content deliverer on the network. In the present embodiment, "authority" is used as a domain name managed as a unique name on the Internet.

The "content_id" following "authority/" is an ID uniquely identifying content in the authority. The character string format may be arbitrarily controlled in the authority. In this way, the content identifier 154 makes it possible to uniquely identify content on the Internet. Thus, by accessing the content identifier 154 as a URL on the Internet, the target content and associated metadata can be obtained.

Delivery date/time 153 normally indicates the date and time when content was stored in the content server 63 for release. There are, however, cases in which the download control information 100 is delivered before releasing of the content. In such cases, the delivery date/time 153 included in the download control information 100 indicates a scheduled release date/time of the content. Also, when content already delivered is updated, the delivery date/time 153 indicates the date and time of updating.

Delivered content category 155 indicates the category of content delivered from the server, for example, video, photo, music, program, or multimedia data. The video category, for example, may be further divided, for example, into movie, news, and sports to be indicated as the delivered content category 155. Similarly, the movie category may be further divided, for example, into classic, rock, and jazz.

Delivered content metadata is ancillary content information required to reproduce or execute the content. Such metadata includes, for example, genre or keyword information used for content searching or, when content is video information, a thumbnail or chapter information.

Figure 10:
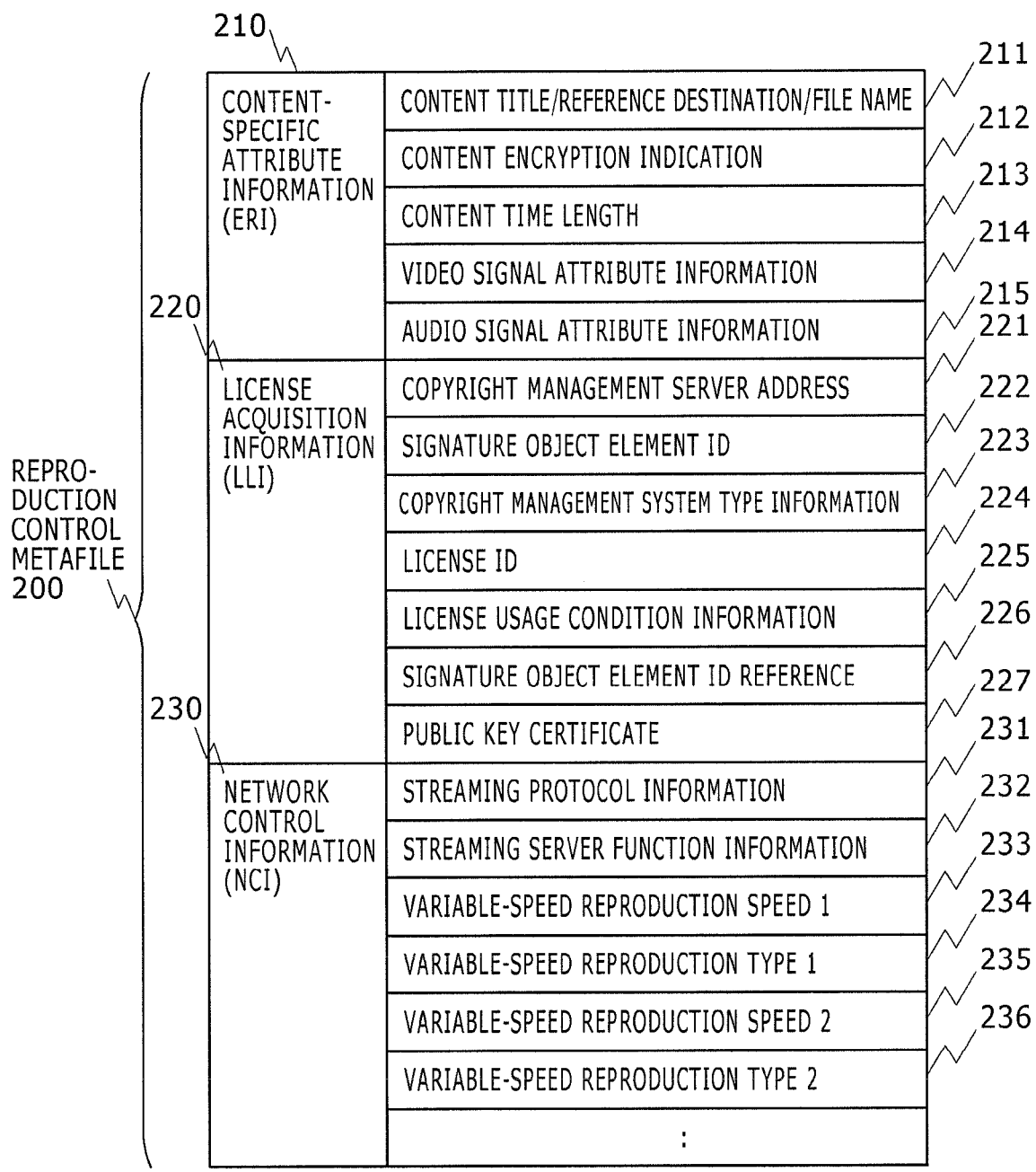
FIG. 10 shows an example of composition of reproduction control metafile.

FIG. 10 shows an example of composition of the reproduction control metafile 200. The composition of the reproduction control metafile 200 that is obtained by referring to the download control information 100 will be described below.

The reproduction control metafile 200 includes three XML documents, i.e. content-specific attribute information 210 which is information about the AV stream of the content and is required when reproducing the content, license acquisition information 220 required, for example, when accessing a copyright management server and acquiring a content key needed to decrypt encrypted content code, and network control information 230 required when performing reproduction control for streaming VOD. The network control information 230 is not required in the case of download delivery.

The content-specific attribute information 210 provides such information as: content body file name and reference destination 211, content encryption indicator information 212 indicating whether content is encrypted, content time length 213, video signal attribute information 214 indicating, for example, a video encoding method, resolution, scanning method and aspect ratio, and audio signal attribute information 215 indicating, for example, whether audio is stereo, monaural, or multi-channel.

The content license acquisition information 220 provides such information as: copyright management server address information 221 indicating where the license for the content can be obtained, copyright management system type information 223, license ID 224 indicating the type of copyright protection range associated with the content, signature object element value 222 and reference destination 226 required for server authentication between the copyright management server and the receiver, i.e. a client, license usage condition information 225, and public key certificate 227 required for signature verification.

The network control information 230 provides such information as: streaming protocol information 231 indicating an available streaming protocol system; special reproduction and content position search method 232; information 233 including streaming server function information indicating, for example, whether suspended reproduction can be resumed from the suspended position and information indicating available reproduction speed factors in cases where the server is capable of variable-speed reproduction; and variable-speed reproduction method information 234.

The reproduction method may be one in which a stream for variable-speed reproduction only prepared on the server side is delivered or one in which pseudo high-speed reproduction is realized by skipping still images included in a stream for normal-speed reproduction.

Figure 11:
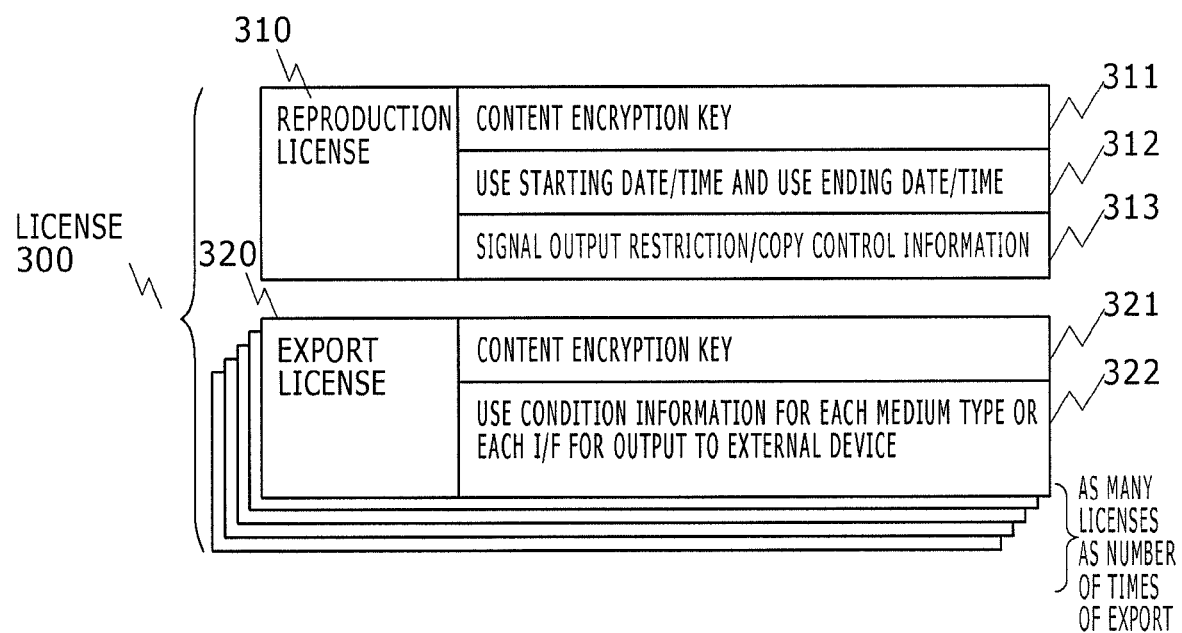
FIG. 11 shows an example of composition of a license.

FIG. 11 shows an example of composition of the license 300. The composition of the license 300 obtained by making reference to the download control information 100 or obtained when content reproduction or content export is started will be described.

There are two licenses, i.e. a reproduction license 310 describing a right to view a program and an export license 320 describing a right to export content to an external medium or network.

The licenses each has a content encryption key 311 or 321 required for decrypting content. The license 310 has such information as use starting date/time and use ending date/time 312 and reproduction signal output restriction and copy control information 313.

The use starting date/time and use ending date/time 312 may be specified to be indefinite.

The export license 320 may include, for each medium (or network) which can be an export destination, use condition information 322 describing copy restriction and analog output restriction applied when content is exported to such medium (or network).

The export license 320 is good for one export. When a piece of content is to be exported N times, as many as N export licenses 320 are delivered from the DRM server 64 to the receiver 50.

Next, example user interfaces realized for receiver applications based on the above-described system configuration and data structure will be described with reference to FIGS. 12 to 19.

FIG. 12 shows an example of content search screen 1000 realized by the ECG processing unit 52.

This screen displayed using a remote controller shows optional selection items including input fields such as keyword 1001, genre 1002, delivery date 1003, price 1004, and delivery type 1005. When Search 1007 is selected, the ECG metadata 400 is searched in accordance with the conditions specified by the user.

FIG. 13 is an example of search result screen 1100 displayed by the ECG processing unit 52. In this example, the screen displays a list of search results including title 1101, delivery type 1102, and purchase state 1103 along with selection buttons for individual content such as Purchase or Details 1104, VOD viewing 1105, and DL-related buttons 1106.

In the delivery type column 1102 corresponding to the package metadata 450, "VOD" indicates that the content is delivered only on a VOD basis (streaming delivery), "DL" indicates that the content is delivered only as download delivery, "VOD/DL" indicates that the content is delivered both as VOD delivery and as DL delivery. "VOD" stands for Video On Demand.

The purchase state column 1103 indicates receiver-managed information, i.e. whether the content has been purchased or has not been purchased, or whether the content is free of charge.

The Purchase or Details button 1104 shows "Purchase" when the content has not been purchased and "Details" when the content has been purchased or when the content being free of charge need not be purchased.

The "VOD viewing" button 1105 is displayed only when the content is available for VOD (streaming). When this button is selected, VOD viewing is started.

The DL-related buttons 1106 are displayed only when the content is downloadable. When the content has not been downloaded after downloading has been instructed, an inoperable "DL not started" button appears. The button changes to "DL in progress" when the content starts being downloaded. When downloading of the content is finished, "DL viewing" is shown, then the downloaded content can be viewed by selecting the "DL viewing" button. The receiver may have a function to allow viewing content in a state of "DL in progress" when the content has been buffered to some extent.

Figure 14:
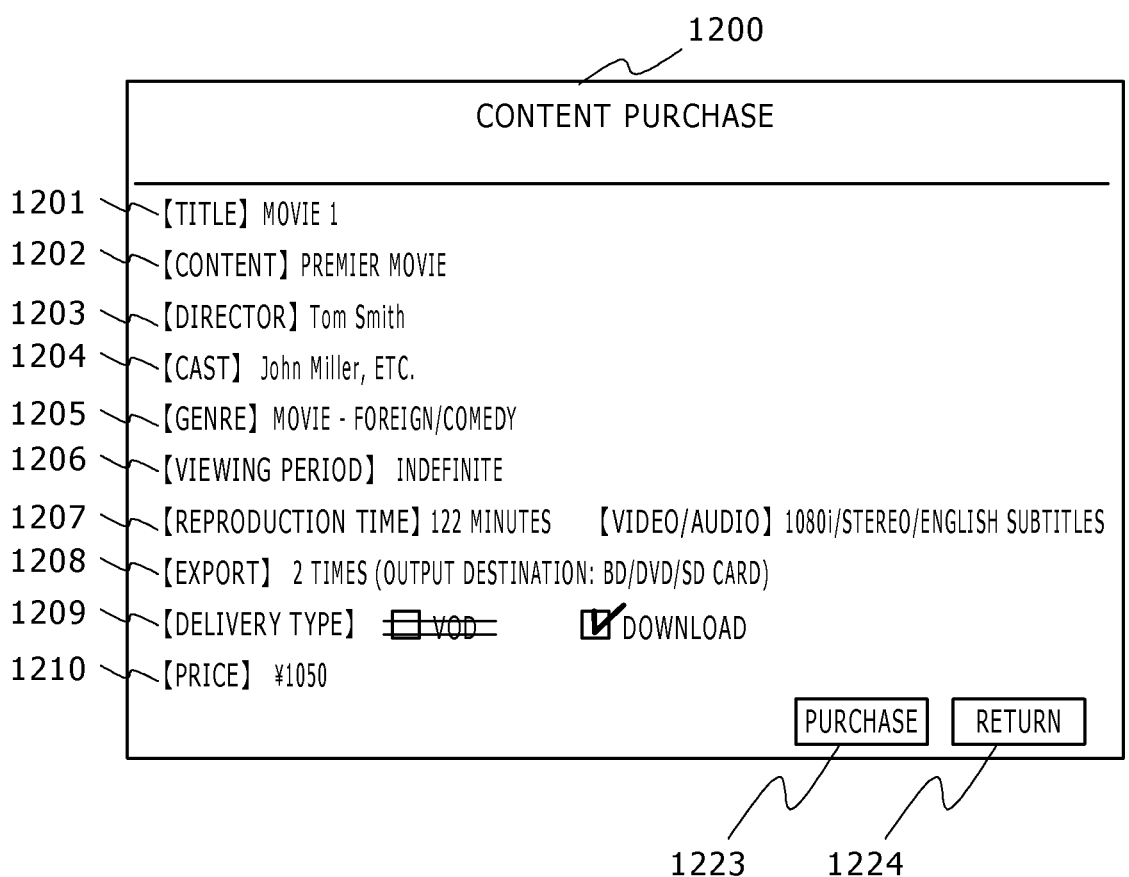
FIG. 14 shows an example of content purchase screen of a receiver.

FIG. 14 shows an example of content purchase screen displayed by the ECG processing unit 52. The content purchase screen 1200 is displayed when the "Purchase" button is selected on the search result screen 1100.

The content purchase screen 1200 shows, based on the ECG metadata 400, information to be checked when purchasing content such as title 1201, content 1202, director 1203, cast 1204, genre 1205, viewing time limit 1206, reproduction time and video/audio information 1207, number of exports allowed and output destination information 1208, delivery type options 1209, and price 1210. When the delivery type 1209 is optional, "VOD" or "Download" or both can be selected.

In the example shown in FIG. 14, "VOD" is deleted indicating that it cannot be selected, whereas "Download" is effective. On the screen, "Download" is checked indicating it has been selected by the user.

When the "Purchase" button 1223 is selected after necessary selections are made, a content purchase transaction is started between the receiver and the delivery system.

When the "Return" button 1224 is selected, the display returns to the search result screen 1100.

Figure 15:
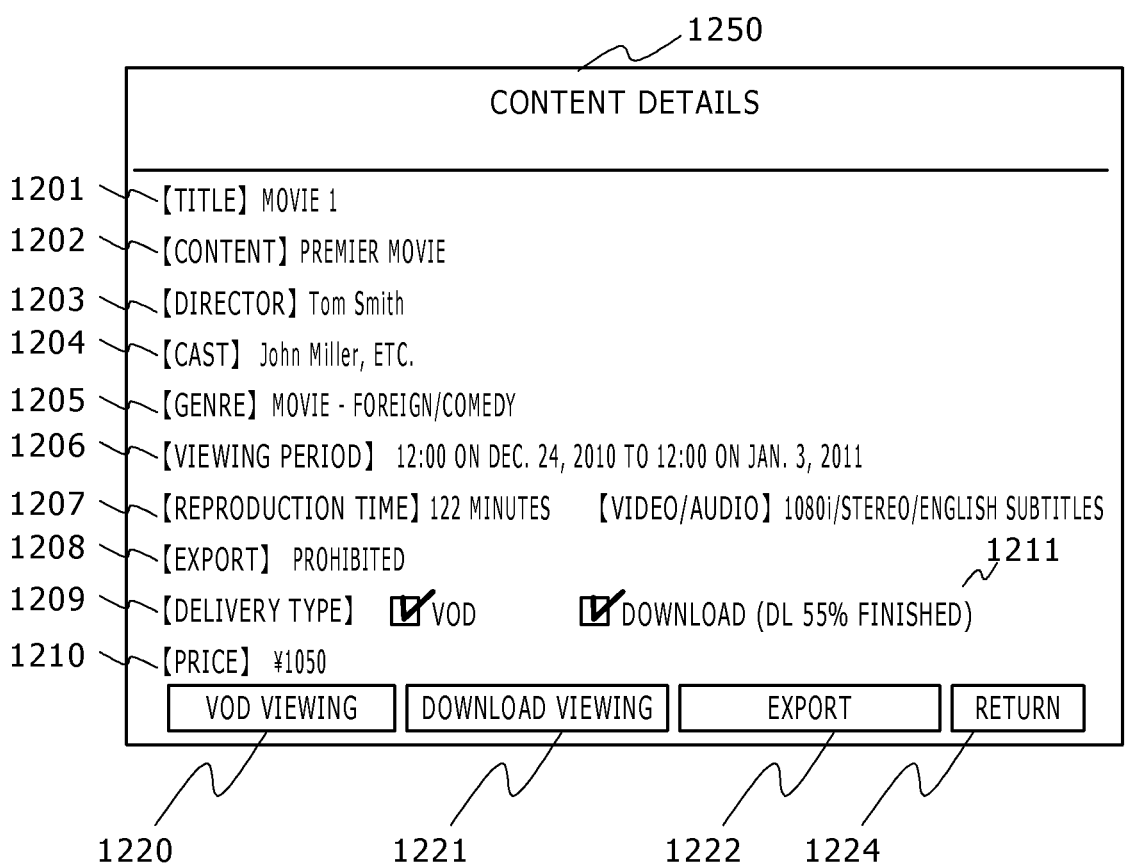
FIG. 15 shows an example of content details display screen of a receiver.

FIG. 15 shows an example of content details screen 1250 displayed by the ECG processing unit 52. The content details screen 1250 is displayed when the user selects the "Details" button on the search result screen 1100 after purchasing content.

The content details screen 1250 is approximately the same as the content purchase screen 1200, but, since it is displayed after content is purchased, it does not show the "Purchase" button 1223. Instead, it shows the "VOD viewing" button 1220, "Download viewing" button 1221, and "Export" button 1222. These buttons are operable when the corresponding functions are available for the content.

The field of the delivery type 1209 only shows the delivery type applied to the purchased content, allowing no selection to be made for the content already purchased. When the content is download-viewable, there may be cases in which a download progress state 1211 is shown.

Figure 16:
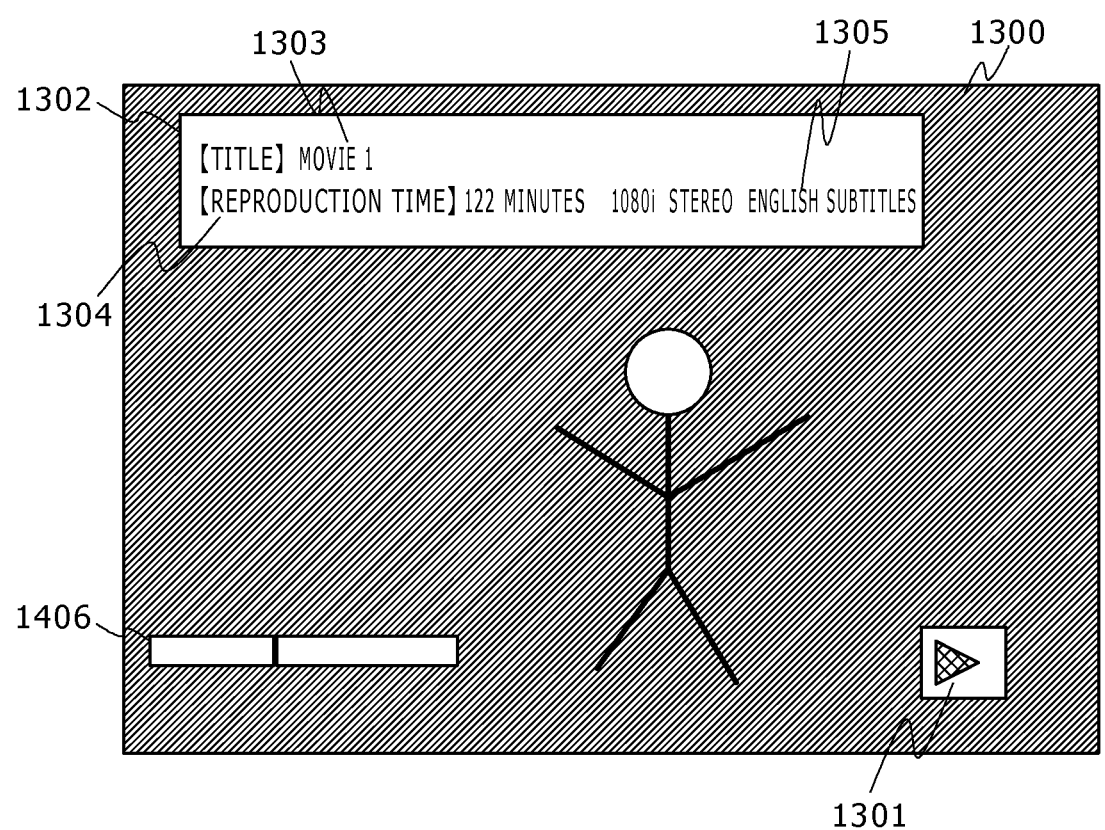
FIG. 16 shows an example of content reproduction screen of a receiver.

FIG. 16 shows an example of content reproduction screen 1300 displayed by the ECG processing unit 52. The content reproduction screen 1300 is displayed when VOD viewing or download viewing is selected on the content search result screen 1100 or on the content details screen 1250.

Based on the reproduction control information 200, the content reproduction screen 1300 shows, in title banner 1302, content title 1302, reproduction time 1304, and detailed video/audio information 1305. According to remote controller operation, the operation being performed is indicated by icon display 1301. Depending on the type of the receiver, the current position of reproduction relative to the total reproduction time is also shown as a current reproduction position display 1306.

Figure 17:
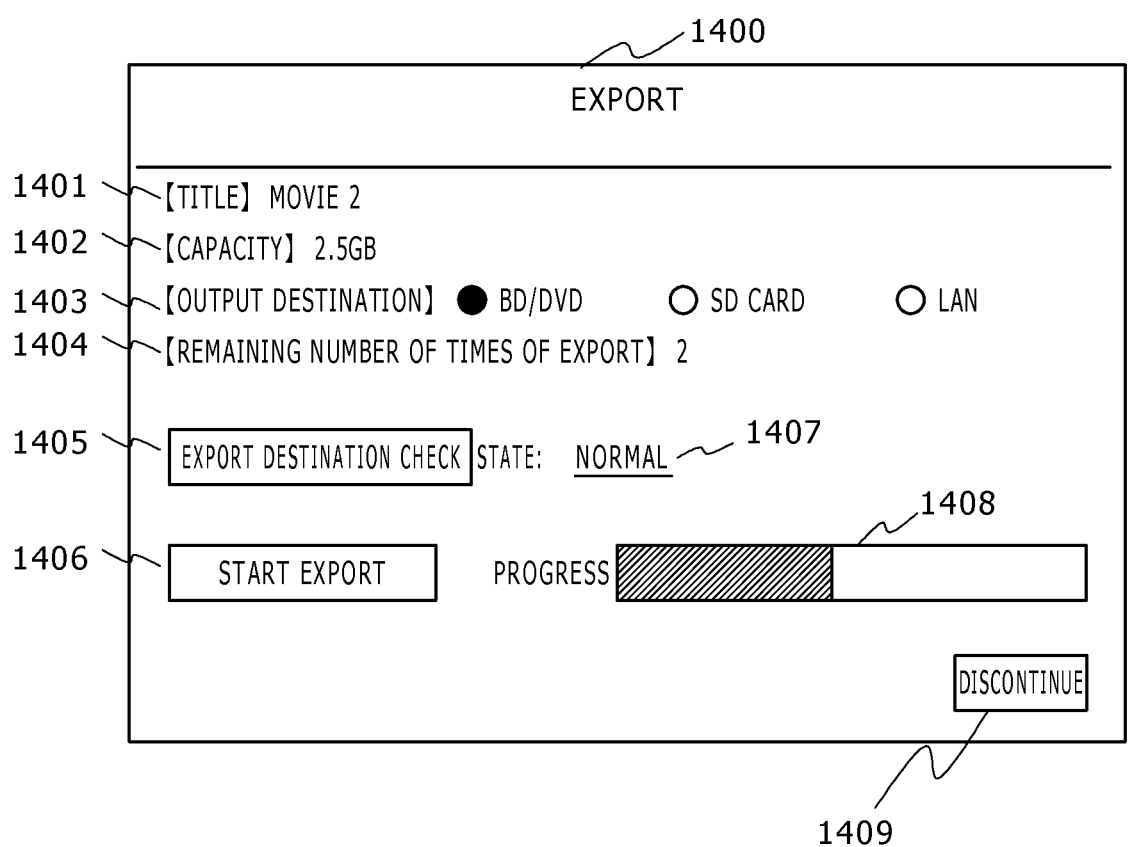
FIG. 17 shows an example of export screen of a receiver.

FIG. 17 shows an example of export screen 1400 displayed by the ECG processing unit 52. The export screen 1400 is displayed when export is specified on the content details screen 1250.

The export screen 1400 shows, based on the ECG metadata 400, content title 1401 and capacity 1402. It also shows, allowable export destination options 1403 and a remaining number of times of export 1404 controlled by the receiver.

When, after selecting an export destination, the user selects the "Export destination check" button 1405, whether the content to be exported can be recorded on the export destination medium is checked. When the content is determined to be recordable, "Normal" is displayed in state field 1407. When the content is not recordable, the reason why is displayed in the state field 1407.

When the "Start export" button 1406 is selected, prior checking is made like when the "Export destination check" button 1405 is selected, and, if any problem is detected, it is indicated in the state field 1407. In the case of the "Start export" button 1406, when no problem is detected, export is started.

The progress of export is indicated as progress 1408. When the export is completed, the remaining number of times of export 1407 is decremented by one on the export screen 1400.

To discontinue export in progress and return to the content details screen 1250, select the "Discontinue" button 1409.

The ECG screen generated by the ECG processing unit 52 is configured as described above.

Another procedure can be used in which processing leading from a content search to content reproduction can be performed by showing the web document 71 obtained from the web server 61 using the browser 51 instead of the ECG processing unit 52.

Figure 18:
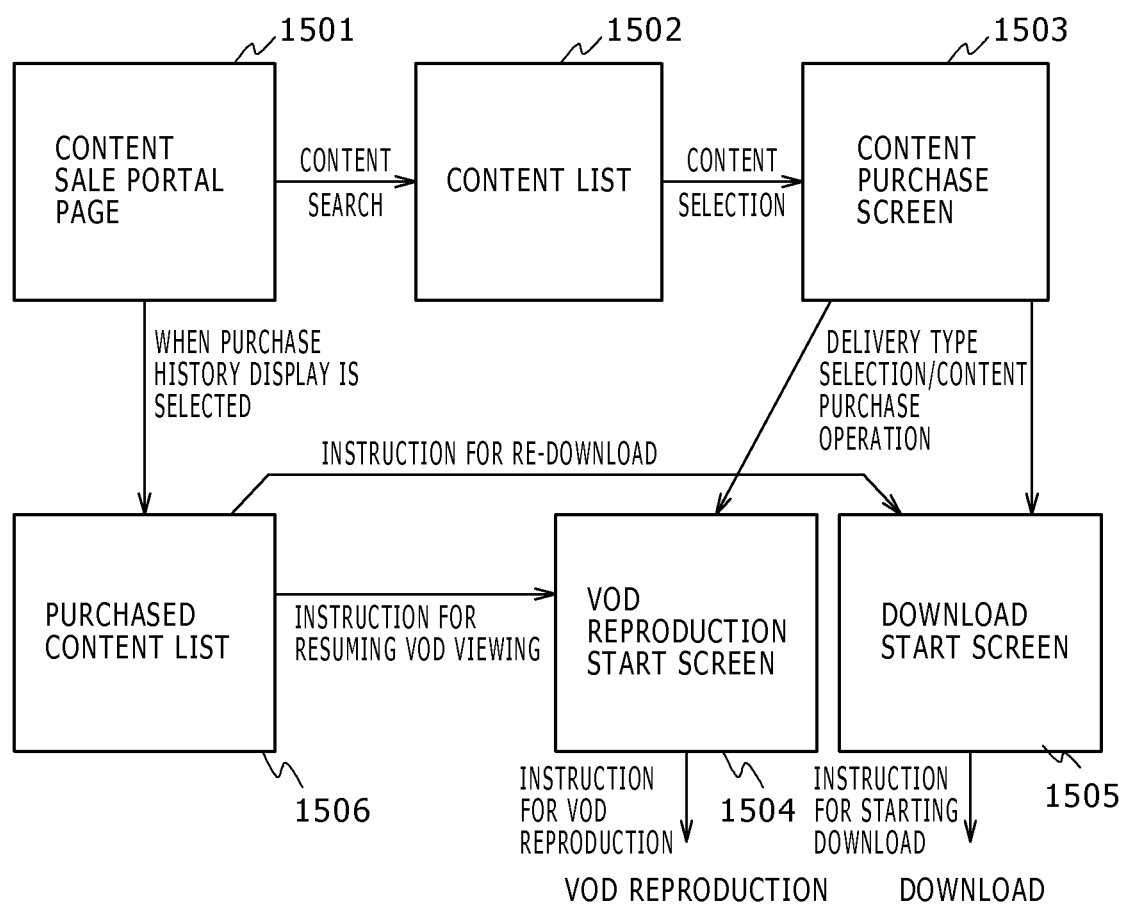
FIG. 18 shows an example of transition of web content displayed by a browser of a receiver.

FIG. 18 shows an example of transition of the web document 71 presented on the browser 51.

The browser 51 first displays a content sale portal page 1501 when it is activated to display a home page or when a corresponding bookmark is selected. When a content search is instructed on the content sale portal page 1501, the browser 51 displays a content list page 1502 showing the search results. When content is selected from the search results, a content purchase page 1503 is displayed.

When, on the content purchase screen 1503, a content purchase on a VOD basis is selected, the browser 51 displays a VOD reproduction start page 1504 and, when VOD reproduction is instructed, displays, by referring to the reproduction metafile 200, the content reproduction screen as shown in FIG. 16.

Also, when, on the content purchase screen 1503, a content purchase on a download basis is selected, the browser 51 displays a download start page 1505 and, when downloading is instructed, starts downloading the content in the background based on the download control information 100.

FIG. 19 shows an example of local navigation screen 1600 displayed by the browser 51. The local navigation screen 1600 shows the state of content for download delivery.

A list of content including both content to be downloaded and content already downloaded is shown on this screen. For each content, title 1601, download state 1602, purchase state 1603 are shown along with a "Purchase" or "Details" button 1604. Furthermore, as an indication of purchase condition, a "View" button 1605 is shown for viewable content and an "Export" button 1606 is shown for exportable content.

The local navigation screen 1600 may have a search condition input field so as to enable searching for content out of the content for which downloading has already been instructed from the receiver 50 or which has already been downloaded. In this case, the search result display screen may show "Details", "View", and "Export" buttons as on the local navigation screen shown in FIG. 19. In this way, the user can conveniently find desired content out of the content stored in the receiver 50 and, for example, export the content. Processing to follow operation button selection made by the user or an instruction for searching inputted by the user is performed by the ECG processing unit 52 as being described later with reference to FIG. 25.

The download state field 1602 shows download state indications such as "DL not started" indicating that, although downloading of the content has been instructed, the content has not been downloaded, "DL in progress" accompanied by a download progress percentage indication indicating that the content is being downloaded, "DL completed" indicating that downloading of the content has been completed, and "DL error" indicating that downloading of the content has been discontinued as a result of occurrence of an error during downloading.

The purchase state field 1603 shows purchase states such as "Not purchased", "Purchased" and "Free of charge".

As for the buttons, the "Purchase" button is displayed for content not yet purchased and the "Details" button is displayed for content already purchased. The "View" button becomes effective and selectable when downloading of the content is completed or, even before completion, has progressed to such an extent that reproduction can be started.

When the "View" button 1605 is selected, the display changes to the content viewing screen 1300. When the "Export" button 1606 is selected, the display changes to the export screen 1400.

As described above, operation leading from a content search to content reproduction can be performed on a Web site.

Next, export processing will be described in detail with reference to FIGS. 20 and 21.

Figure 20:
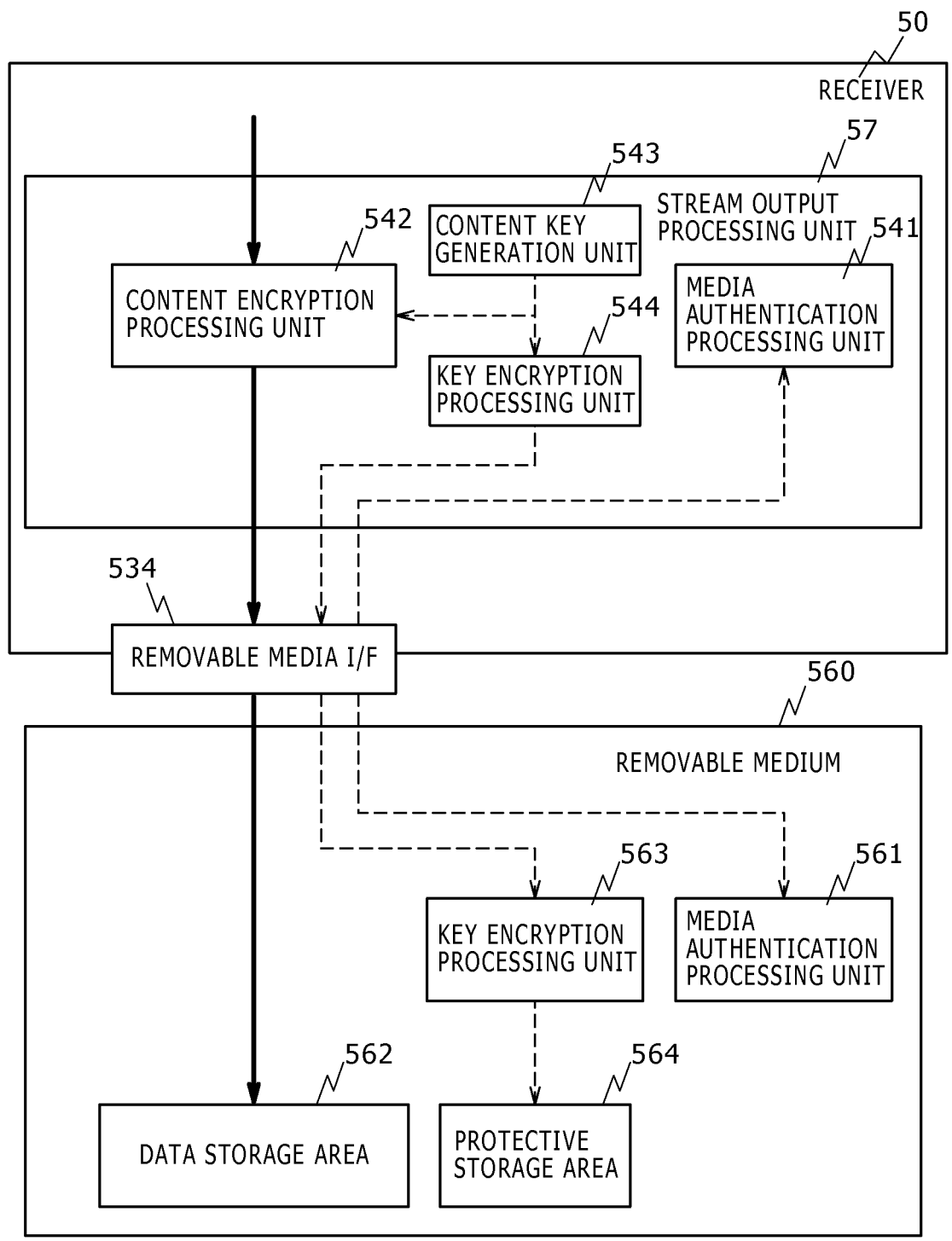
FIG. 20 shows an example configuration of an interface portion between a receiver and a removable medium.

FIG. 20 shows an example configuration of interface between the receiver and a removable medium. The removable medium is assumed to be a removable HDD such as, but not limited to, iVDR (registered trademark).

Figure 21:
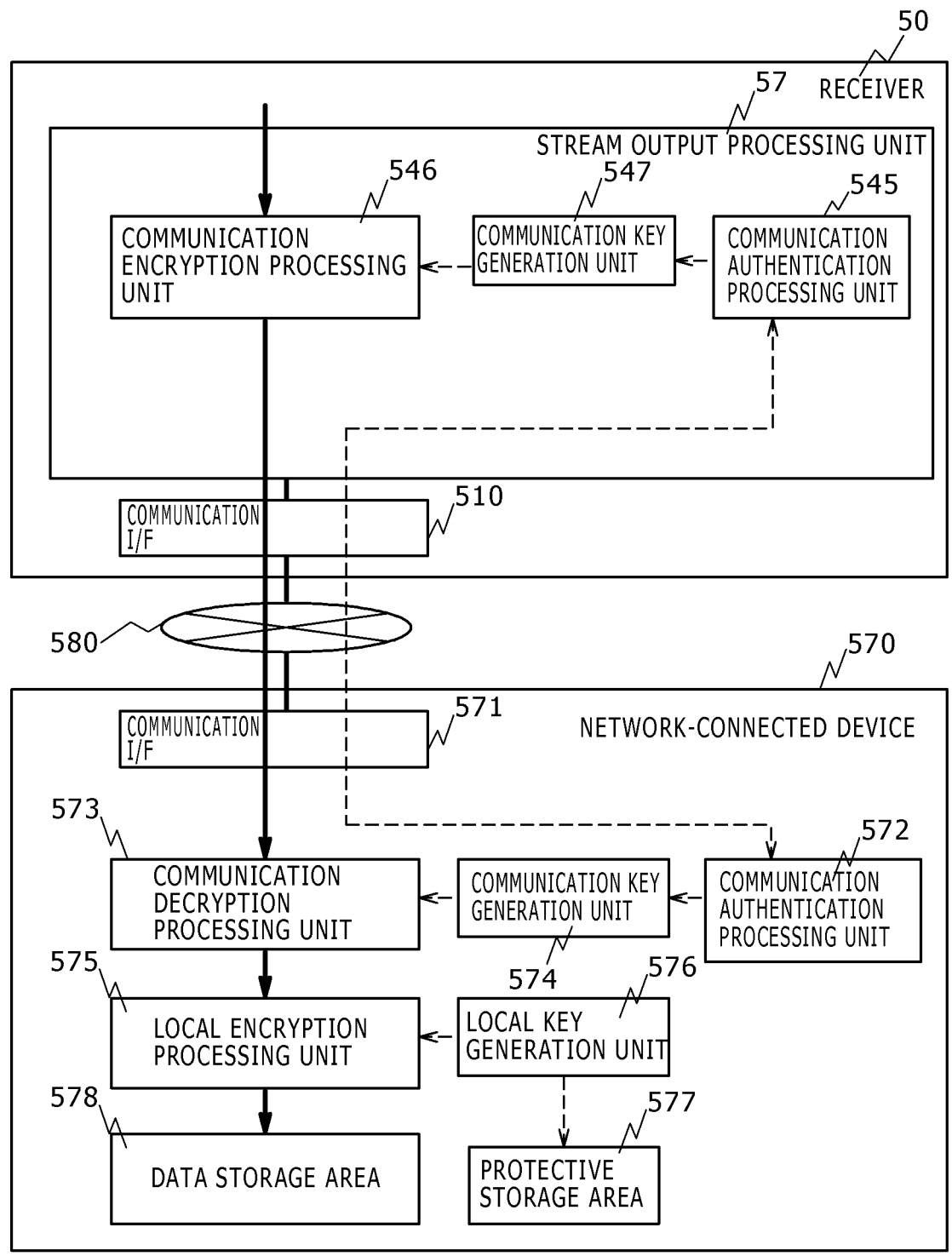
FIG. 21 shows an example configuration of an interface portion between a receiver and a network-connected device.

In FIGS. 20 and 21, solid arrows represent content flows, and dashed arrows represent control flows.

In FIG. 20, an example configuration of the stream output processing unit 57 that processes content export to a removable medium 560 having a copyright protection function is shown. The stream output processing unit 57 of the receiver 50 includes a media authentication processing unit 541 which performs authentication with the removable medium, a content key generation unit 543 which generates an encryption key for encrypting content to be transferred to the medium, a content encryption processing unit 542 which encrypts the content based on the content key, and a key encryption processing unit 544 which transfers the generated content key to the removable medium after encrypting the content key. The content for input to the content encryption processing unit 542 is inputted from the decrypter 514 or multiplexer 521 of the receiver 50.

Referring to FIG. 20, it is possible to realize by hardware all or part of the media authentication processing unit 541, the content key generation unit 543, the content encryption processing unit 542, and the key encryption processing unit 544, for example, by forming them, as the respective processing units, into an integrated circuit. Also, all or part of the processing can be realized by software by processing such programs as a media authentication processing program 541, a content key generation program 543, a content encryption processing program 542, and a key encryption processing program 544 stored in a storage device, for example, the storage 550 or a memory, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

In the removable medium 560 connected to the receiver 50 via a removable I/F 534, the content key and the information about conditions for content use (number of times of copying and time limit for use) received from the receiver is stored, being associated with the content, in a media authentication processing unit 561 which performs mutual authentication with the media authentication processing unit 541 of the receiver 50, a key decryption processing unit 563 which decrypts the encrypted content key received, and a protected storage area 546 which allows only the mutually authenticated reliable receiver 50 to write/read information thereto/therefrom.

The number of times of copying represents the number of times the recorded content can be copied. Namely, when the number is M, the user can use as many as M+1 sets of the content including the originally received content body. The time limit for use indicates the time limit for using the content, for example, on a removable medium. It can be represented as described below.

(1) In relative time with respect to the time when the content is written to, for example, a removable medium (2) In relative time with respect to the time when the content is initially accessed on a removable medium (3) Absolute date/time for starting use of the content and absolute date/time for ending use of the content (Either one or both are omissible. When the starting date/time or the ending date/time is omitted, the omitted date/time is regarded as indefinite.)

Referring to FIG. 20, it is possible to realize by hardware all or part of the media authentication processing unit 561 and the key decryption processing unit 563, for example, by forming them, as the respective processing units, into an integrated circuit. Also, all or part of the processing can be realized by software by processing such programs as a media authentication processing program 561 and a key decryption processing program 563 stored in a data storage area 562, a protective storage area 564, or a memory area, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

The content encrypted at the media encryption processing unit 542 is stored in the data storage area 562 via the removable I/F 534.

The media authentication processing unit 541 may authenticate the reliability of the removable medium 560 or both the removable medium 560 and the receiver 50 provided with the removable I/F 534 depending on the case.

When the content stored in the removable medium 560 is to be read out by the mutually authenticated receiver 50, the receiver 50 reads the content key of the content from the protective storage area 564 and decrypts, at the receiver 50, the encrypted content read out from the data storage area 562 using the content key. This makes the content usable.

FIG. 21 shows an example configuration of an interface portion between the receiver and a network-connected device. In FIG. 21, an example configuration of the stream output processing unit 57 that performs export processing via a network having a copyright protection function is shown. In this case, stream output processing unit 57 of the receiver 50 includes a communication authentication processing unit 545 which performs mutual authentication with a network-connected device, a communication key generation unit 547 which generates a communication key for content encryption based on a common key exchanged at the time of authentication, and a communication encryption processing unit 546 which encrypts content based on the communication key generated and sends out the content via a communication I/F 510.

Referring to FIG. 21, it is possible to realize by hardware all or part of the communication authentication processing unit 545, the communication encryption processing unit 546, and the communication key generation unit 547, for example, by forming them, as the respective processing units, into an integrated circuit. Also, all or part of the processing can be realized by software by processing such programs as a communication authentication processing program 545, a communication encryption processing program 546, and a communication key generation program 547 stored in a storage device, for example, the storage 550 or a memory, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

A network-connected device is connected to a network 580 via a communication I/F 571 and communicates with the receiver 50.

A communication authentication processing unit 572 performs mutual authentication with the communication authentication processing unit 545 of the receiver. A communication key generation unit 574 generates a communication key for content decryption based on the common key exchanged at the time of authentication. A communication decryption processing unit 573 decrypts the content received via the communication I/R 510 based on the communication key generated.

In the example shown in FIG. 21, the content decrypted at the communication decryption processing unit 573 is encrypted at a local encryption processing unit 575 based on the encryption system of the network-connected device 570 and is stored in a data storage area 578 of the network-connected device 570. The encryption key used at this time is generated at a local key generation unit 576. The local key corresponding to the content and the information about conditions for using the content (number of times of copying and time limit for use) is stored in a protected storage area 577 which can be accessed only by reliable devices and software.

Referring to FIG. 21, it is possible to realize by hardware all or part of the communication decryption processing unit 573, the communication key generation unit 574, the local encryption processing unit 575, and the local key generation unit 576, for example, by forming them, as the respective processing units, into an integrated circuit. Also, all or part of the processing can be realized by software by processing such programs as a communication decryption processing program 573, a communication key generation program 574, a local encryption processing program 575, and a local key generation program 576 stored in a data storage area 578, a protective storage area 577, or a memory area, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

Even though, in the example shown in FIG. 21, the network-connected device 570 has the device-specific data storage area 578, an alternative configuration may be used in which the network-connected device 570 has a removable I/F 534 like that of the receiver 50 shown in FIG. 20 and in which the content received via the network is transferred to a removable medium 560 via the removable I/F 534. In this case, the network-connected device 570 is assumed to have a configuration similar to that of the receiver 50 shown in FIG. 20.

Examples of processing performed by a receiver compatible with the above-described content delivery will be described with reference to FIGS. 22 to 25.

Figure 22:
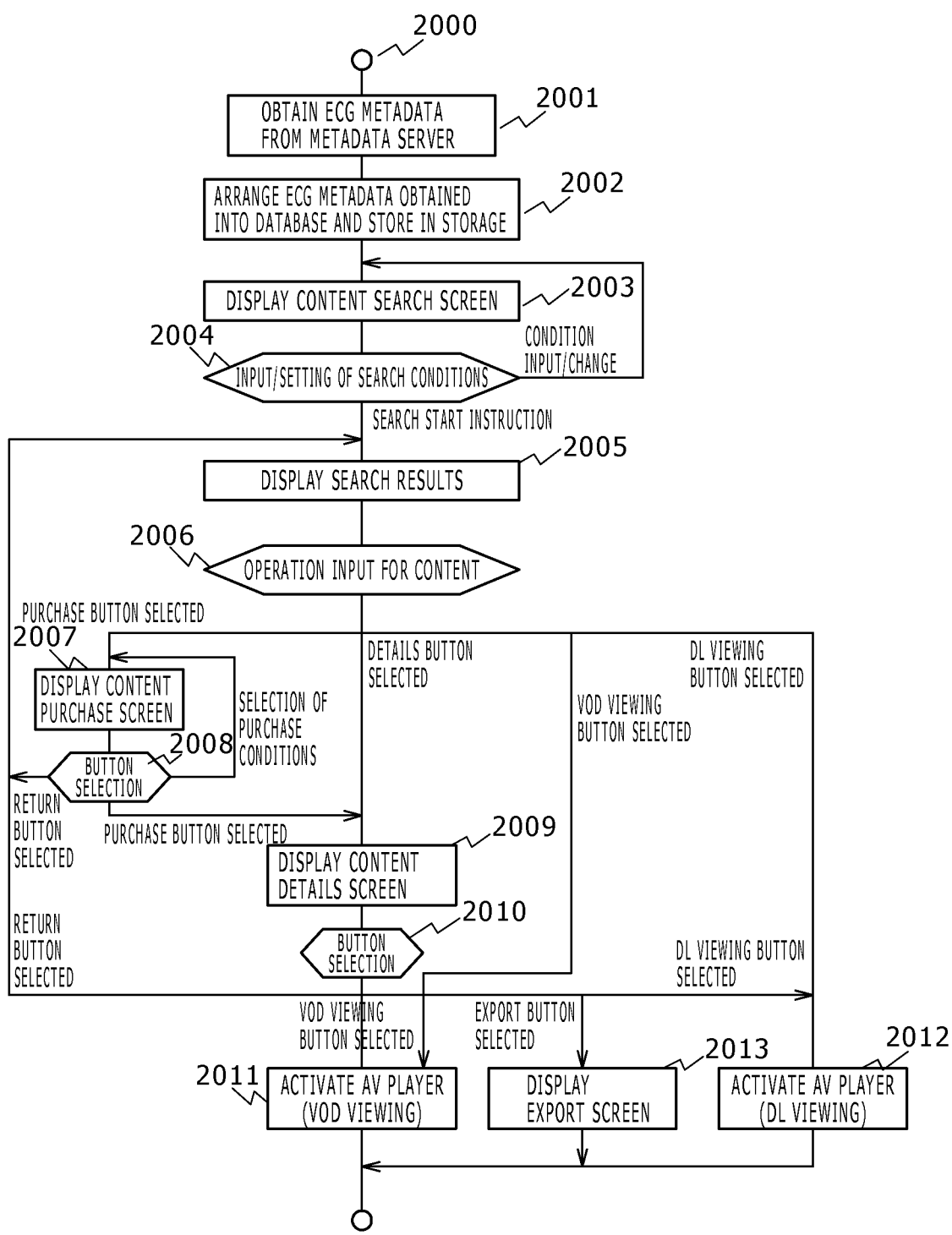
FIG. 22 is an example process flow diagram for an ECG processing unit.

FIG. 22 is an example process flow diagram 2000 for the ECG processing unit 52.

The ECG processing unit 52 obtains ECG metadata from the metadata server (2001), stores the ECG metadata obtained in a storage after arranging the ECG metadata into a database for easy data processing (2002), and displays the content search screen 1000 (2003).

When, on the content search screen 1000, search conditions are inputted and set (2004) and searching is instructed, the ECG processing unit 52 displays the search result screen 1100. When, on the screen, operations related with the content are performed (2006) and the "Purchase" button is selected, the ECG processing unit 52 displays the content purchase screen 1200 (2007). When, on the screen, the user selects purchase conditions and selects the "Purchase" button (2008), the ECG processing unit 52 displays the content details screen 1250 (2009). The content details screen 1250 is also displayed when the "Details" button is selected on the search result screen 1100.

When the user selects the "VOD viewing" button on the search result screen 1100, the AV player is activated and VOD viewing is started (2011). When the user selects the "DL viewing" button, the AV player is activated and download viewing is started (2012).

On the content details screen 1250, when the user selects the "VOD viewing" button, the AV player is activated and VOD viewing is started (2011). When the user selects the "DL viewing" button, the AV player is activated and download viewing is started (2012). When the "Export" button is selected, the display changes to the export screen 1400 (2013).

Figure 23:
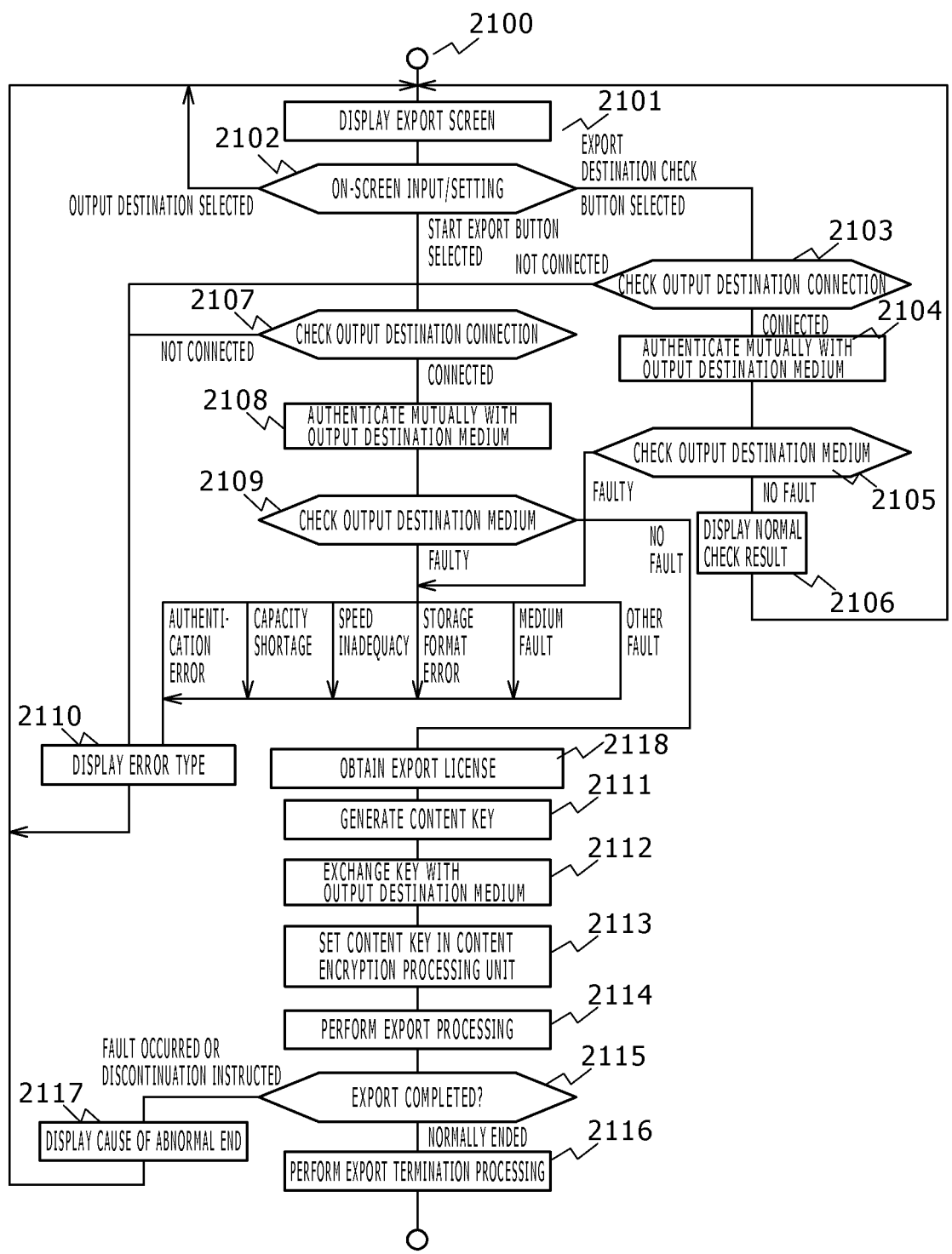
FIG. 23 is an example process flow diagram for export from a stream output processing unit to a removable medium.

FIG. 23 is an example process flow diagram for the stream output processing unit 57 exporting content to the removable medium 560 on the export screen 1400.

When, after the export screen 1400 is displayed (2101), the user selects an output destination and the "Export destination check" button on the screen (2102), the stream output processing unit 57 checks to see if the removable medium 560 is connected to the output destination (2103). If not connected, an error message indicating the unconnected state is displayed (2110).

If connected, the media authentication processing unit 541 checks authentication with the removable medium 560 at the output destination (2104) and makes detailed checks of the removable medium 560 (2105). If no fault to obstruct writing of the content is detected, a normal check result is indicated (2106). If the removable medium 560 is found faulty, the error type is indicated (2110) and the export screen returns to a state ready to accept operation (2102).

The error may vary in kind. It may be an authentication error caused on the removable medium 560 side or on the receiver 50 side, an error due to a capacity shortage for content writing, an error due to an inadequate speed of the removable medium 560 for content reproduction, a storage format error with the file format specified for the removable medium 560 being inappropriate for content storage, or a read/write error of the removable medium 560.

When, on the export screen 1400, the "Start export" button is selected, the stream output processing unit 57 checks to see if the removable medium 560 is connected at the output destination (2107). If not connected, an error message indicating the unconnected state is displayed (2110). If connected, the stream output processing unit 57 next checks authentication with the removable medium 560 at the output destination (2108) and makes detailed checks of the removable medium 560 (2109). If any fault to obstruct writing of the content is detected, the error type is indicated (2110), and the export screen returns to a state ready to accept operation (2102). When no fault is detected, export processing is started.

In export processing, the DRM client 54 obtains an export license 320 from the DRM server 64 (2118), then the content key generation unit 543 generates a content key (2111). The key encryption processing unit 544 encrypts the content key and exchanges the key with the removable medium 560 at the output destination (2112). The content key generation unit 543 sets the content key in the content encryption processing unit 542 (2113). The content encryption processing unit 542 performs processing to export the content to the removable medium 560 (2114).

In export termination processing (2116) performed after completion of the export (2115), the media authentication processing unit 561 stores the content key and information about the conditions for using the content in the removable medium 560 and updates file management information so as to make the removable medium 560 accessible from other receivers for reading/writing. If the export is discontinued before completion by the user or due to occurrence of a fault in the removable medium 560, the cause of the abnormal ending is displayed (2117) and the initial export screen is restored (2101).

Figure 24:
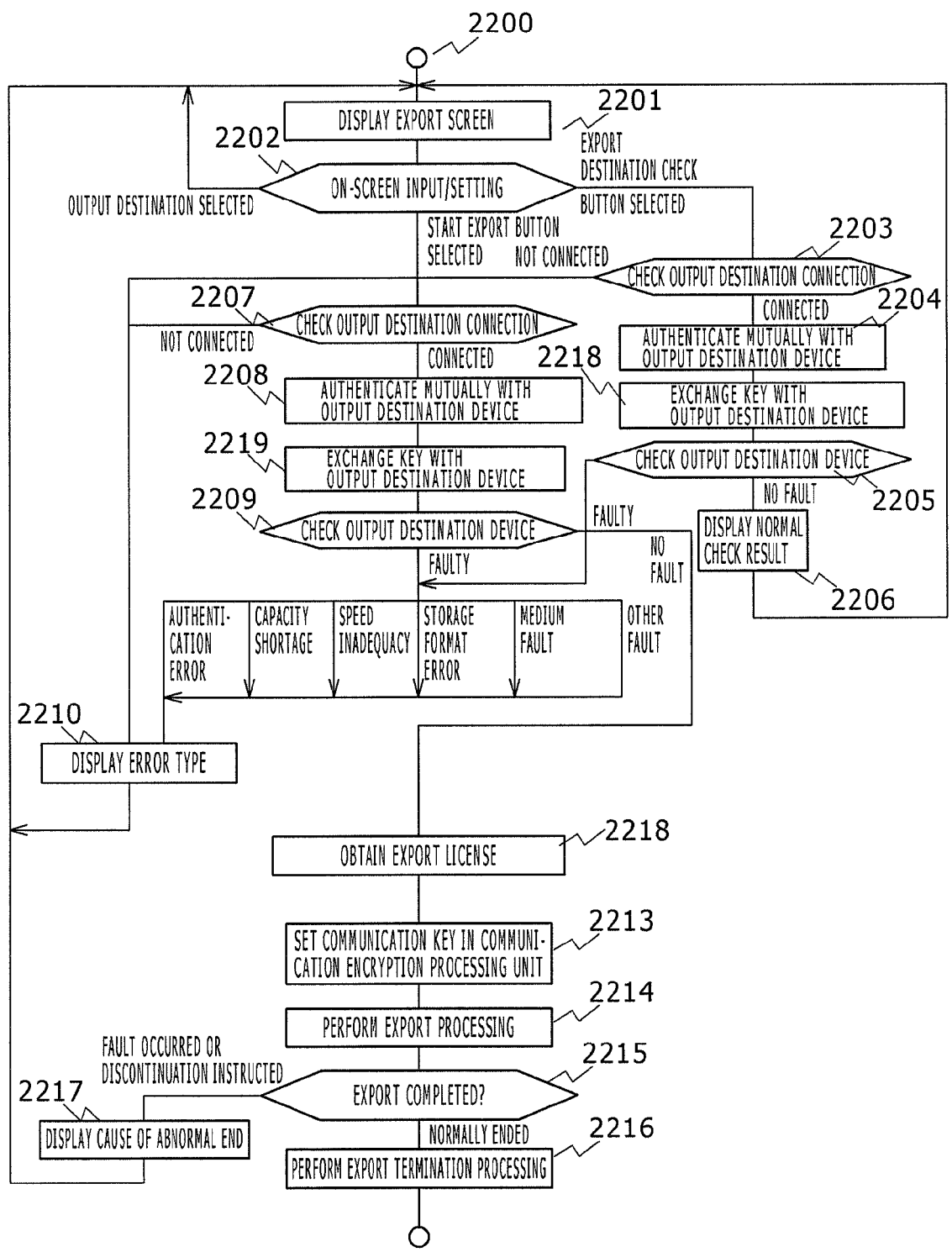
FIG. 24 is an example process flow diagram for export from a stream output processing unit to a network-connected device.

FIG. 24 is an example process flow diagram for the stream output processing unit 57 exporting content to the network-connected device 570 on the export screen 1400.

When, after the export screen 1400 is displayed (2201), the user selects an output destination and the "Export destination check" button on the screen (2202), the communication authentication processing unit 545 checks to see if the network-connected device 570 is connected to the output destination (2203). If not connected, an error message indicating the unconnected state is displayed (2210). If connected, the communication authentication processing unit 545 checks authentication with the network-connected device 570 at the output destination (2204) and makes detailed checks of the network-connected device 570 (2205). If no fault to obstruct writing of the content is detected, a normal check result is indicated (2206). If the network-connected device 570 is found faulty, the error type is indicated (2210) and the export screen returns to a state ready to accept operation (2202).

The error may vary in kind. It may be, like in the case of content export to the removable medium 560, an authentication error caused on the network-connected device 570 side or on the receiver 50 side, an error due to a capacity shortage for content storage on the network-connected device 570 side, an error due to an inadequate speed of the network-connected device 570 for content reproduction, a storage format error with the file format specified for the network-connected device 570 being inappropriate for content storage, or a hardware fault of the network-connected device 570.

When, on the export screen 1400, the "Start export" button is selected, the communication authentication processing unit 545 checks to see if the network-connected device 570 is connected at the output destination (2207). If not connected, an error message indicating the unconnected state is displayed (2210). If connected, the communication authentication processing unit 545 next checks authentication with the network-connected device 570 at the output destination (2208) and makes detailed checks of the network-connected device 570 (2209). If any fault to obstruct writing of the content is detected, the error type is indicated (2210), and the export screen returns to a state ready to accept operation (2202). When no fault is detected, export processing is started.

In export processing, the DRM client 54 obtains an export license 320 from the DRM server 64 (2218), then the communication authentication processing unit 545 sets a communication key generated based on the key exchanged at the time of mutual authentication in the communication encryption processing unit 546 (2213). The communication encryption processing unit 546 then performs processing for exporting the content to the network-connected device 570 (2214).

When the export is completed (2215), export termination processing (2216) including processing for closing the communication session is performed. If the export is discontinued before completion by the user or due to occurrence of a fault in the network-connected device 570, the cause of the abnormal ending is displayed (2217) and the initial export screen is restored (2201).

Figure 25:
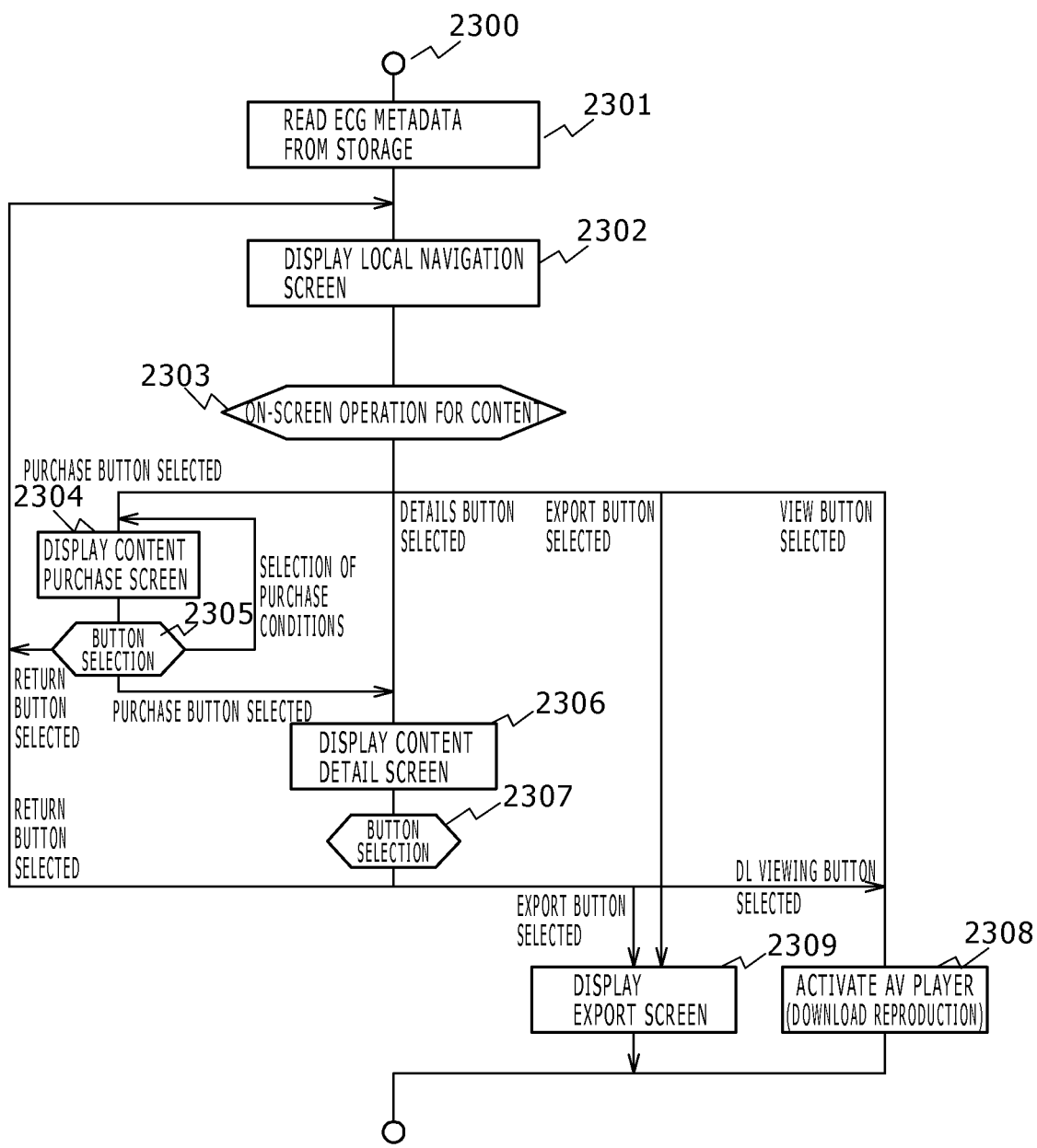
FIG. 25 is an example process flow diagram for local navigation.

FIG. 25 is an example process flow diagram for processing performed by the ECG processing unit 52 on the local navigation screen 1600.

The ECG processing unit 52 reads out the ECG metadata, stored in a storage unit, not shown, about the content for download delivery (2301) and, based on the metadata, displays the local navigation screen 1600 (2302).

The local navigation screen 1600 displayed accepts on-screen operation by the user (2303). When the "Purchase button is selected, the ECG processing unit 52 displays the content purchase screen 1200 (2304). When, on the content purchase screen 1200, the user selects purchase conditions and selects the "Purchase" button (2305), the ECG processing unit 52 displays the content details display screen 1250 (2306). The content details display screen 1250 is displayed also when the "Details" button is selected on the local navigation screen 1600.

When, on the local navigation screen 1600, the "View" button is selected, the ECG processing unit 52 activates the AV player 53 and download viewing is started (2308). When the "Export" button is selected, the display changes to the export screen 1400 (2309).

On the content details display screen, too, when the user selects the "View" button (2307), the AV player 53 is activated and download viewing is started (2308). When the "Export" button is selected, the display changes to the export screen 1400 (2309).

According to the above embodiment, the receiver 50 can obtain content for viewing from the ECG displayed by the ECG processing unit 52 or from the web screen displayed by the browser 51 or from, via the local navigation 1600, the delivery system 60 connected to a network.

Even though, in the foregoing, examples of content viewing and content exporting made based on the content search screen and the local navigation screen generated by the ECG processing unit have been described with reference to FIGS. 22 and 25, the methods of viewing and exporting content are not limited to the above described. Similar processing can be performed, for example, using a content search screen and a local navigation screen generated by the browser 51 or generated by the AV player 53.

Other examples of removable medium utilization by the receiver 50 will be described with reference to FIGS. 26 and 27.

Figure 26:
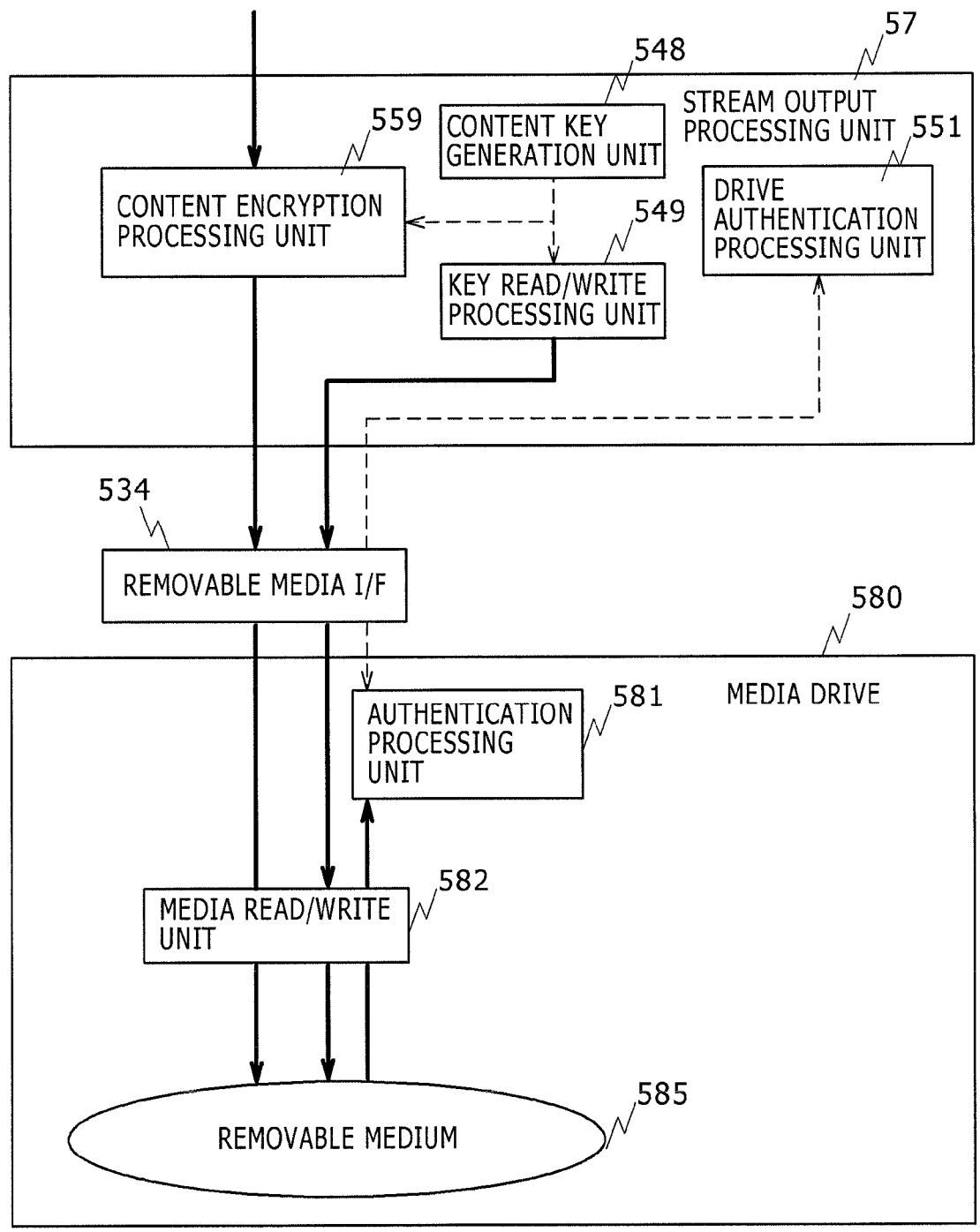
FIG. 26 shows another example configuration of an interface portion between a receiver and a removable medium.

FIG. 26 shows an example in which the removable medium is an optical disc medium. In this example, a media drive 580 is connected to the removable media I/F 534 making it possible to insert a removable medium 585 in the media drive 580 and access the removable medium 585 for read/write operation via a media read/write unit 582.

The stream output processing unit 57 includes a drive authentication processing unit 551, a content key generation unit 548, a key read/write processing unit 549, and a content encryption processing unit 559.

When the removable medium 585 having a copyright protection function is inserted in the media drive 580 having a copyright protection function, copyright-protected content can be read from and written to the removable medium 585. In this state, the stream output processing unit 57 of the receiver 50 performs authentication processing between the authentication processing unit 581 of the media drive 580 and the drive authentication processing unit 551 to check if the removable medium 585 and the media drive 580 are compatible with copyright protection.

After their authenticity is verified, the key generated by the content key generation unit 548 is set in the content encryption unit 550; the content is encrypted and is written to the removable medium 585; and the medium key used to encrypt the content and the information about conditions for using the content (number of times of copying and time limit for use) is written to the removable medium 585 via the key read/write processing unit 549.

Referring to FIG. 26, it is possible to realize by hardware all or part of the drive authentication processing unit 551, the content key generation unit 548, the content encryption processing unit 550, and the key read/write processing unit 549, for example, by forming them, as the respective processing units, into an integrated circuit. Also, all or part of the processing can be realized by software by processing such programs as a drive authentication processing program 551, a content key generation program 548, a content encryption processing program 550, and a key read/write processing program 549 stored in a storage device, for example, the storage 550 or a memory, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

Referring to FIG. 26, it is possible to realize by hardware all or part of the media read/write unit 582 and the authentication processing unit 581, for example, by forming them, as the respective processing units, into an integrated circuit. Also, all or part of the processing can be realized by software by processing such programs as a media read/write program 582 and an authentication processing program 581 stored in a memory area, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

Figure 27:
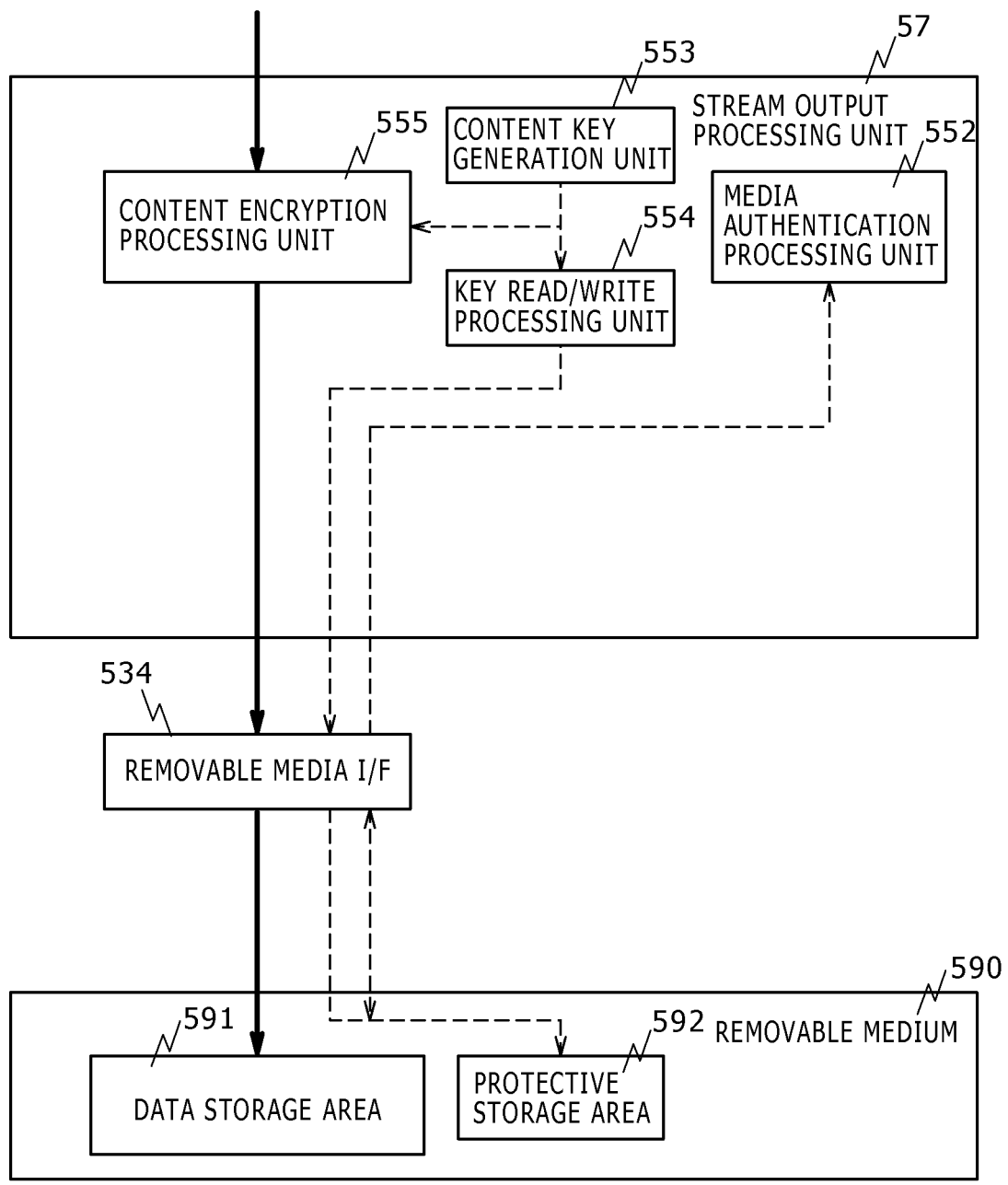
FIG. 27 shows another example configuration of an interface portion between a receiver and a removable medium.

FIG. 27 shows an example in which the removable medium is a memory card. In this example, a removable medium 590 is connected directly to the removable media I/F 534.

The stream output processing unit 57 includes a media authentication processing unit 552, a content key generation unit 553, a key read/write processing unit 554, and a content encryption processing unit 555.

The removable medium 590 includes a general data storage area 591 and a protective storage area 592 for holding a data encryption key. The drive authentication processing unit 552 determines whether the removable medium 590 is compatible with copyright protection according to whether the removable medium 590 has the protective storage area 592. After it is verified that the removable medium 590 is compatible with copyright protection, the media authentication processing unit 552 sets the key generated by the content key generation unit 553 in the content encryption processing unit 555; writes the content, after it is encrypted, to the data storage area 591 of the removable medium 590; and, via the key read/write processing unit 554, stores the medium key used and the information about conditions for using the content (number of times of copying and time limit for use) in the protective storage area 592.

Referring to FIG. 27, it is possible to realize by hardware all or part of the media authentication processing unit 552, the content key generation unit 553, the content encryption processing unit 555, and the key read/write processing unit 554, for example, by forming them, as the respective processing units, into an integrated circuit. Also, all or part of the processing can be realized by software by processing such programs as a media authentication processing program 552, a content key generation program 553, a content encryption processing program 555, and a key read/write processing program 554 stored in a storage device, for example, the storage 550 or a memory, not shown, using an arithmetic processor, for example, a central control unit, not shown.

For simplified description, various kinds of processing that can be realized by having various programs executed, for example, by a central control unit will be described as being performed mainly by the corresponding processing units realized by such programs. In cases where such processing units are realized by hardware, the processing is performed mainly by such hardware-based processing units.

According to the above embodiment, the receiver 50 can export the received copyright-protected content 75 to removable media of various types.

Second Embodiment

As a second embodiment, an example delivery system for download-delivering video content including 3D video (stereoscopic image looking like floating out of a display device) and an example receiver for receiving and reproducing the video content will be described.

The present embodiment will be described centering on a receiver. Even though the present embodiment can be suitably applied to receivers, it may be applied to other than receivers. Also, the configuration of the present embodiment need not be adopted in its entirety. Parts of the configuration may be omitted.

The following description of the present embodiment will be focused on differences from the first embodiment. The aspects not described of the present embodiment are similar to those of the first embodiment.

First, terms related with 3D video will be described.

The 3D video formats include SBS (Side by Side) and MVC (Multiview Video Coding). SBS is not dependent on any video codec. In SBS, 3D video is realized using two video frames, one for the right eye and the other for the left eye, arranged side by side on a screen. MVC is an extension to the video format based on H.264/MPEG-4 AVC standard. In MVC, main video data based on one viewpoint and other video data based on a different viewpoint generated using differential information relative to the main video data are used to realize 3D video with a higher compression ratio than that of SBS. Delivering 3D content in SBS or MVC format makes up a current mainstream technique in the field.

Hence, the present embodiment will be described based on cases in which SBS and MVC are used as 3D video formats, but the 3D video formats that may be used are not limited to SBS and MVC.

The present embodiment is based on the assumptions that, in no content, plural 3D video formats are used and that the number of viewpoints does not vary in any content.

The number of viewpoints referred to above represents the number of angular positions at which 3D video can be stereoscopically seen. In SBS, 3D video is composed of two images based on two, left and right, viewpoints of a viewer right in front of the display device, so that the viewer can have a stereoscopic view only when squarely facing the display device.

To enable the viewer to have a stereoscopic view also when not squarely facing the screen, it is necessary to prepare video images based on viewpoints in as many other directions than the frontal direction as possible and to make an optimum video image selectable according to the angle at which the viewer is watching the screen. This enables the viewer to obtain a stereoscopic view even when watching the screen at the angle of a non-frontal direction.

The number of video images corresponding to image viewing angles is referred to as the number of viewpoints. By increasing the number of video images which correspond to image viewing angles, the viewing angle range that enables the viewer to have a stereoscopic view can be widened.

The present embodiment being described below concerns cases in which, to purchase content including both 3D video and 2D video (flat video), the user using a VOD (Video On Demand) service searches for desired content and, after purchasing the content, displays information about the 3D video included in the content. In the VOD service, the user can have content, for example, a movie program delivered to him/her via a network in accordance with his/her instructions.

The video content delivery system may have the same configuration as the first embodiment shown in FIGS. 1 and 2.

The configuration of the receiver may also be the same as that of the first embodiment shown in FIG. 3, but the video decoder 522 is required to be capable of, when the received content is 3D video, decoding the content, reproducing the decoded content as 3D video, and outputting the 3D video to a video output I/F.

Operations such as searching for video content, browsing detailed information, purchasing content, and instructing downloading of the content are carried out via the browser 51 using the web document 71 obtained from the web server 61 or are carried out, as in the first embodiment, by receiving the ECG metadata 400 shown in FIGS. 7 and 8 and using the ECG processing unit 52.

When downloading is instructed from the web document 71 or from the ECG processing unit 52, the receiver obtains 3D-compatible download control information 700 which is download control information applicable to video content including 3D video from the metadata server 62.

Figure 28:
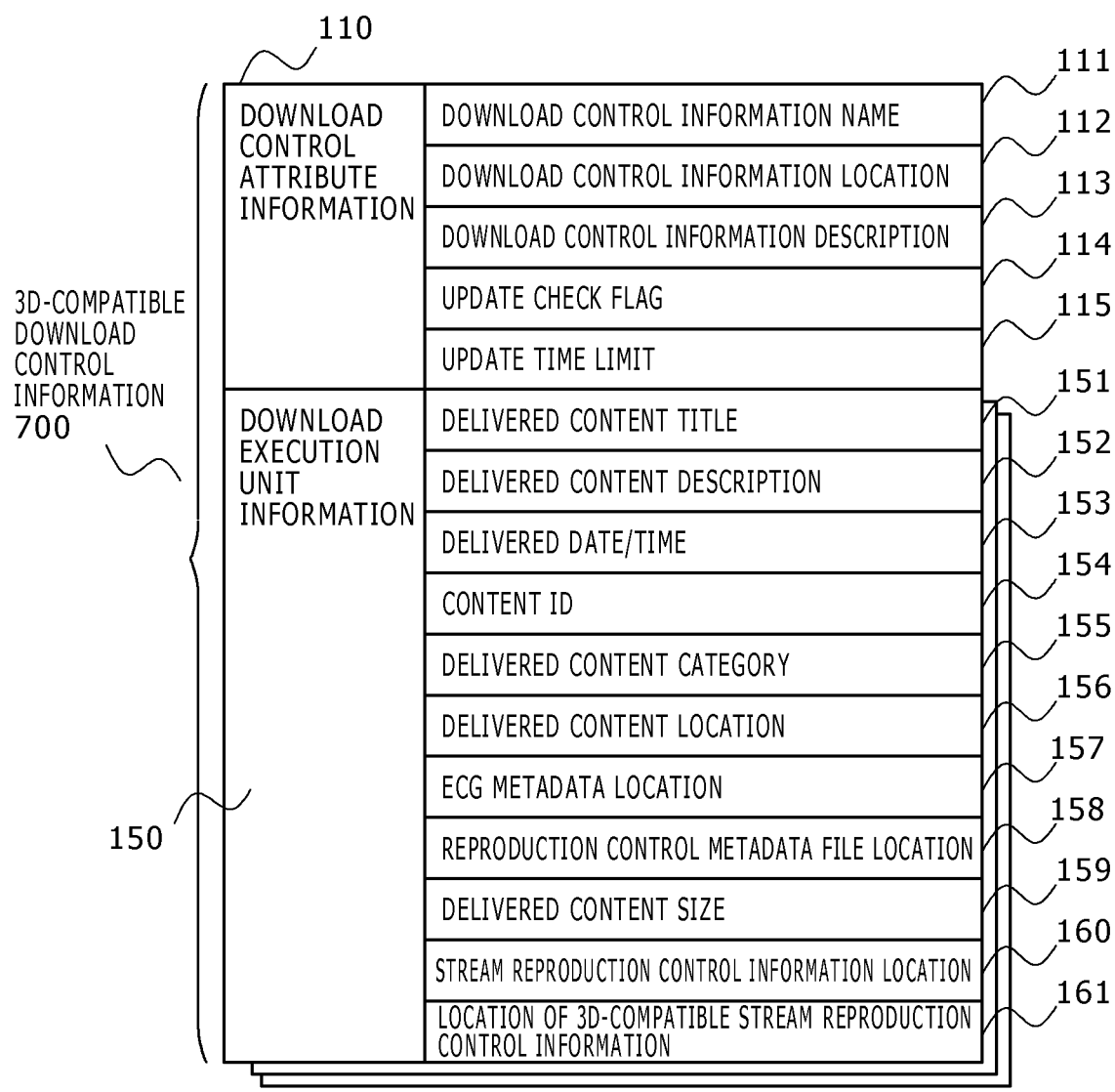
FIG. 28 shows an example of composition of 3D-compatible download control information according to a second embodiment.

FIG. 28 shows an example of data composition of the 3D-compatible download control information 700. The 3D-compatible download control information 700 is equivalent to the download control information 100 shown in FIG. 9 with the down load execution unit information 150 included therein added to by location of 3D-compatible stream reproduction control information 161.

The stream reproduction control information location 160 represents the destination URL for obtaining the stream reproduction information 710 for 2D video content via the Internet. The location of 3D-compatible stream reproduction control information 161 represents the destination URL where the 3D-compatible stream reproduction control information compatible with video content including 3D video can be obtained.

Figure 29:
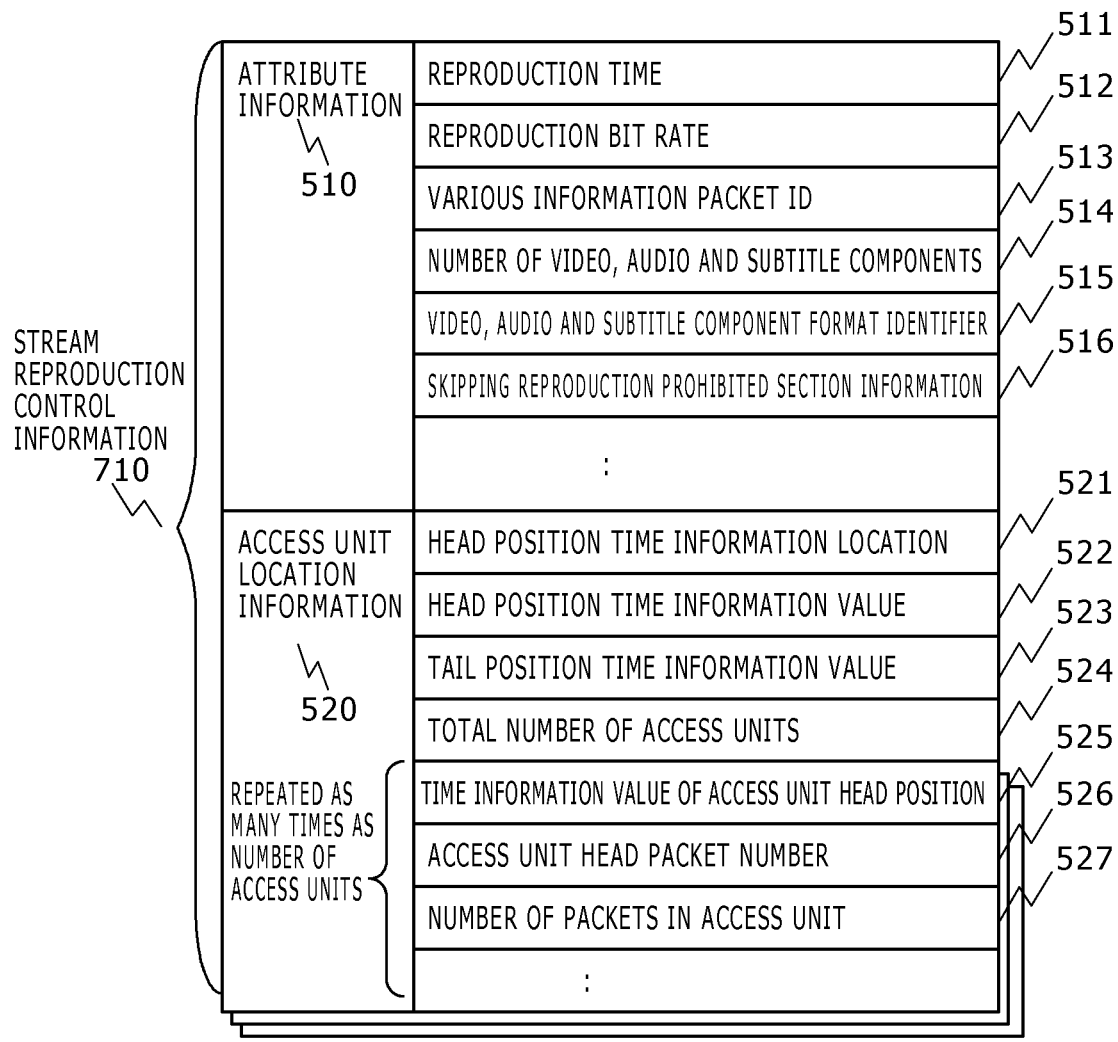
FIG. 29 shows an example of composition of stream reproduction control information according to the second embodiment.
Figure 31:
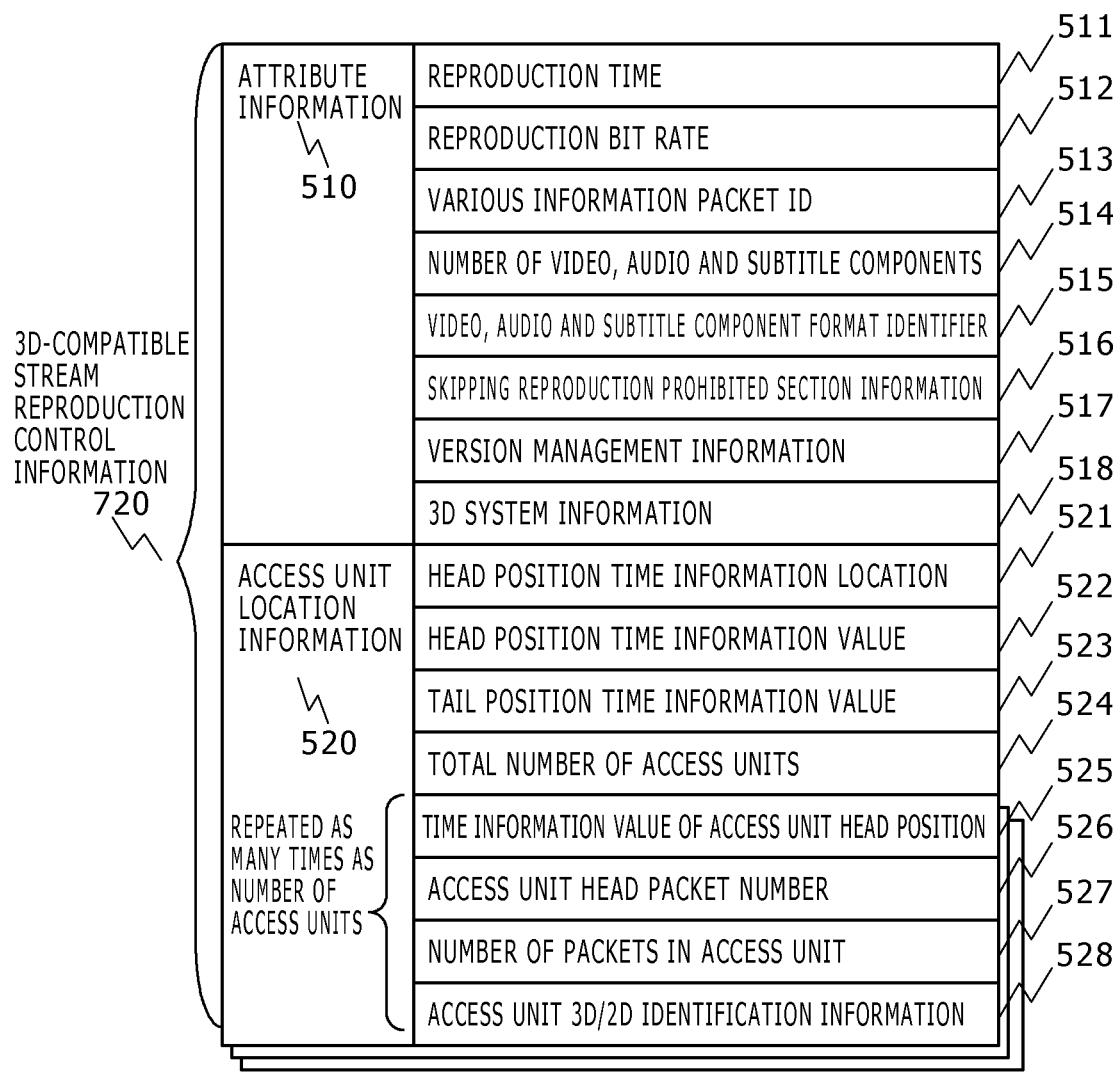
FIG. 31 shows an example of composition of 3D-compatible stream reproduction control information according to the second embodiment.

FIG. 29 shows an example of data composition of the stream reproduction control information 710 for 2D video content. FIG. 31 shows an example of data composition of the 3D-compatible stream reproduction control information 720. The stream reproduction control information 710 includes stream attribute information 510 and access unit location information 520. The stream attribute information 510 includes such information as reproduction time 511, reproduction bit rate 512, information packet ID 513 for video, audio, and subtitle information, number of video, audio and subtitle components included in the content 514, format identifier 515 indicating data formats of video, audio and subtitle components, and skipping reproduction prohibited section information 516 specifying a time period in which skipping video reproduction can be prohibited. The access unit location information 520 includes such information as time information location 521 about the head position of the stream, time information value of stream head position 522, time information value of stream tail position 523, and stream access unit total number 524. The access unit location information 520 further includes, for each of the access units totaling as specified by the access unit total number 524, time information value of access unit head position 525, access unit head packet number 526, and number of packets in access unit 527.

Figure 30:
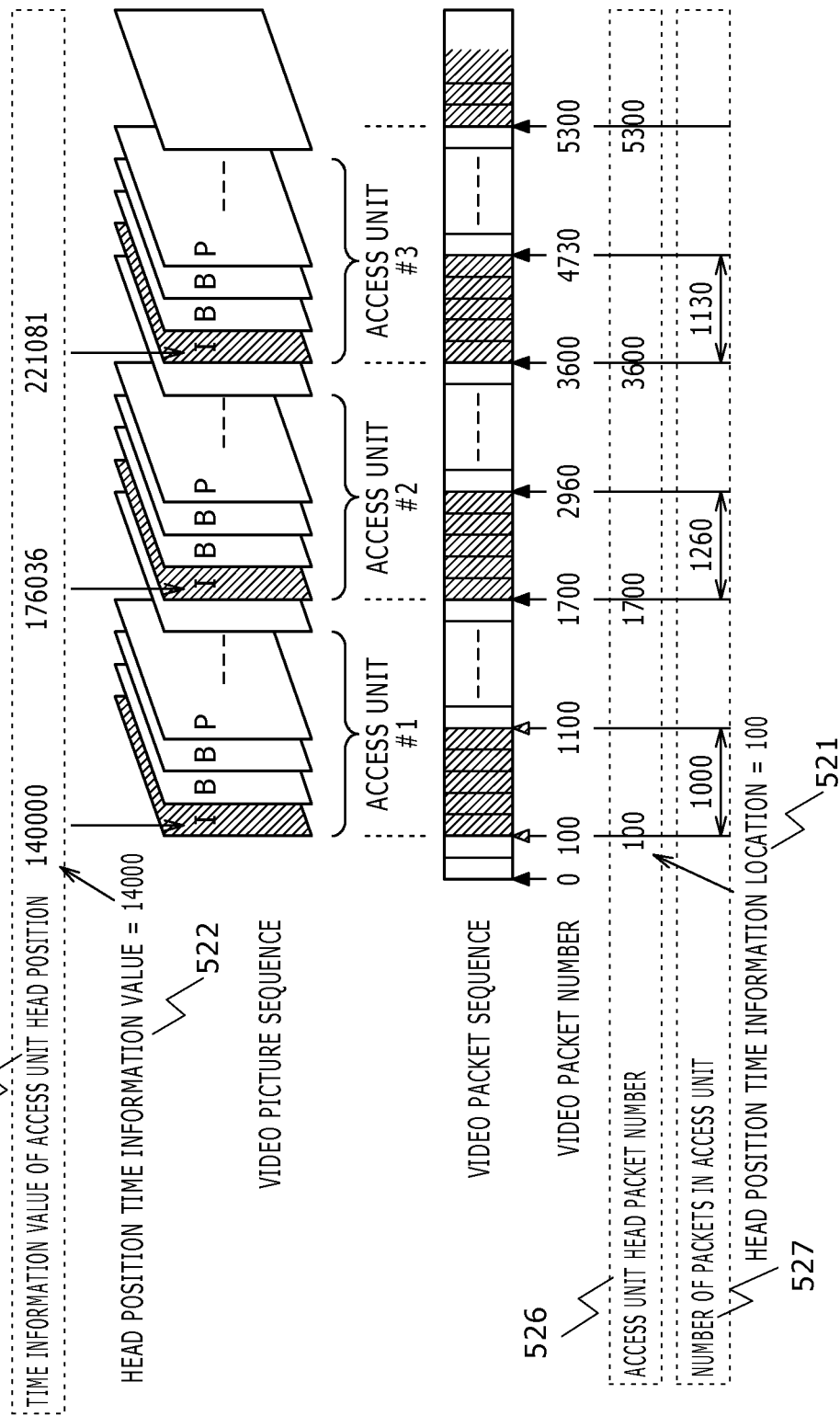
FIG. 30 shows an example of composition of video content according to the second embodiment.

Referring to FIG. 30 showing an example of video stream data composition, each field included in the access unit location information 520 will be described in detail.

As shown in FIG. 30, a video stream is composed of combinations of video pictures I, B and P. Each I-picture is an independently decodable video picture. Each of B-pictures and P-pictures preceding or following I-pictures has difference information relative to an I-picture. The B- and P-pictures cannot be independently decoded. They are decoded using I-picture information.

Therefore, when reproducing a video stream from a midway position thereof, the first picture to be reproduced should be an I-picture. That is, a B-picture or a P-picture cannot be reproduced first.

A group of an I picture which is most appropriate to be the starting picture for reproduction and B- and P-pictures each having difference information relative to the I-picture is referred to as an access unit representing a unit group of pictures.

Each picture included in an access unit has, as ancillary information, time information value relative to the head position of the stream representing the time when the picture is reproduced. Based on the time information, the video decoder 522 performs time-synchronized smooth video reproduction.

A video stream configured as described above is divided into packets of a uniform length for transmission. The video packets are sequentially numbered from the head of the stream, so that a specific video packet can be located based on its packet number.

The respective fields of the access unit location information 520 listed in FIG. 29 hold information as represented in FIG. 30 showing video picture arrangement.

The composition of the 3D-compatible stream reproduction control information 720 compatible with video content including 3D video is equivalent to the composition of the stream reproduction control information 710 shown in FIG. 29 with the attribute information 510 thereof added to by version management information 517 and 3D system information 518 indicating a 3D video encoding system and with the access unit location information 520 thereof added to by 3D/2D identification information 528 for each access unit.

The 3D-compatible stream reproduction control information 720 having the 3D/2D identification information 528 for each access unit makes it possible, even when starting reproduction with an optional I-picture, to determine whether or not the I-picture is a 3D video picture.

The flow of overall processing for downloading content and reproducing the downloaded content by the receiver is the same as shown in FIG. 6 for the first embodiment.

When content downloading is instructed from the browser 51 or the ECG processing unit 52, the download control information 100 is obtained through the links indicated by the web document 71 and the ECG metadata 400, and the content is downloaded by the downloader 55 based on the download control information 100. In cases where the content includes 3D video, the 3D-compatible download control information 700 instead of the download control information 100 is linked from the web document 71 and the ECG metadata 400, and the downloader 55 obtains, based on the 3D-compatible download control information 700, the ECG metadata 400 about the content to be downloaded, the reproduction control metafile 200, the stream reproduction control information 710, and the content 75, then stores them in the storage 550.

If the location of 3D-compatible stream reproduction control information 161 is found described when the downloader 55 refers to the 3D-compatible download control information 700, the stream reproduction control information location 160 is ignored and the 3D-compatible stream reproduction control information 720 indicated by the location of 3D-compatible stream reproduction control information 161 is obtained.

The processing flow for reproducing and exporting content stored in the storage 550 is the same as the processing flow shown in FIG. 25 for the first embodiment.

The AV player 53 activated in block 2308 reproduces video, audio and subtitles by decoding the data read out from the storage 550.

In normal-speed reproduction, the AV player 53 is only required to sequentially decode video stream data. However, when special reproduction, for example, fast reproduction at high speed, skipping reproduction at intervals of several minutes, or jumping to a preset chapter position is instructed by the user, it becomes necessary to start reproduction from an access unit at a midway point of a video stream.

In such a case, the AV player 53 obtains, by referring to the stream reproduction control information 710, the location information about the access unit with which to start special reproduction and starts decoding beginning with the I-picture of the access unit. In this way, perfect image reproduction can be started quickly for whatever special reproduction.

To realize special reproduction of video content including 3D video, the AV player 53 obtains, by referring to the 3D-compatible stream reproduction control information 720, the location information about the access unit with which to start special reproduction. At the same time, the AV player obtains the access unit 3D/2D identification information 528 about the access unit and, when the identification information indicates 2D, starts decoding the access unit as 2D video beginning with the I-picture thereof while setting the video output interface into a state for 2D output. If the identification information indicates 3D, the AV player starts decoding the access unit as 3D video beginning with the I-picture thereof while setting the video output interface into a state for 3D output.

In this way, for whatever special reproduction, video content including both 2D and 3D video can be reproduced without distorting the display on the screen.

Third Embodiment

As a third embodiment, another example delivery system for download-delivering content including 3D video and another example receiver for receiving and reproducing the video content will be described.

The third embodiment differs from the second embodiment as follows.

Figure 32:
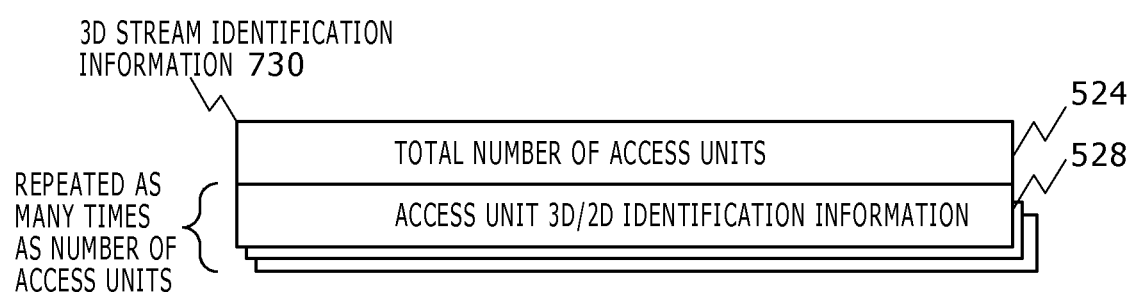
FIG. 32 shows an example of composition of 3D stream identification information according to a third embodiment.

In the third embodiment, instead of the 3D-compatible stream reproduction control information 720 to be transmitted when delivering content including 3D video, a combination of the stream reproduction control information 710 and 3D-compatible stream identification information 730 shown in FIG. 32 is used.

The 3D stream identification information 730 is a table in which only the access unit 3D/2D identification information 528 for each access unit that was added to the stream reproduction control information 710 to thereby generate the 3D-compatible stream reproduction control information 720 is independently held. In the table, following the total number of access units 524, as many pieces of access unit 3D/2D identification information 528 as the total number are stored corresponding to the access unit sequence.

The location of 3D-compatible stream reproduction control information 161 included in the 3D-compatible download control information 700 indicates the URL where not the 3D-compatible stream reproduction information 720, but the 3D-compatible stream identification information 730 can be obtained. The downloader 55 refers to the 3D-compatible download control information 700, obtains the stream reproduction control information 710 referred to by the stream reproduction control information location 160, and also obtains the 3D stream identification information 730 referred to by the location of 3D-compatible stream reproduction control information 161.

Content stored in the storage 550 can be reproduced basically in the same manner as used in the second embodiment. However, for special reproduction of content including 3D video, the AV player 53 obtains, by referring to the stream reproduction control information 710, the location information about the access unit with which to start special reproduction of the content. At the same time, the AV player 53 obtains the access unit 3D/2D identification information 528 about the access unit and, when the identification information indicates 2D, starts decoding the access unit as 2D video beginning with the I-picture thereof while setting the video output interface into a state for 2D output. If the identification information indicates 3D, the AV 53 player starts decoding the access unit as 3D video beginning with the I-picture thereof while setting the video output interface into a state for 3D output.

In this way, for whatever special reproduction, video content including both 2D and 3D video can be reproduced without distorting the display on the screen. Moreover, when delivering video content including 3D video, the data composition of the stream reproduction control information 710 can be made use of as it is. Thus, the present embodiment is advantageous in that, with the difference information required when content to be reproduced includes 3D video provided as an independent file, malfunction of an existing type of 3D-incompatible receiver can be prevented and in that, when upgrading a 3D-incompatible receiver to a 3D-compatible receiver, development man-hours can be reduced.

Fourth Embodiment

As a fourth embodiment, another example receiver which, in a delivery system for download-delivering video content including 3D video, records received video content on a removable medium will be described.

The portions not particularly described in the following of the fourth embodiment are configured to be basically the same as the third embodiment. The fourth embodiment differs from the third embodiment as follows.

Figure 33:
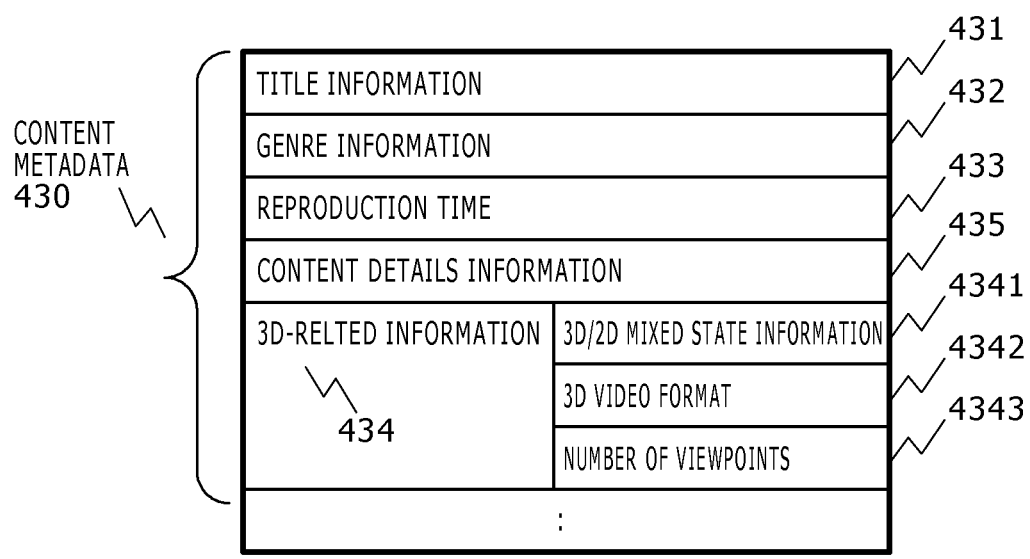
FIG. 33 shows an example of composition of content metadata 430 according to a fourth embodiment.

FIG. 33 shows an example of composition of the content metadata 430 included in the ECG metadata 400 to be delivered by the metadata server 62.

The content metadata 430 includes, at least, title information 431, genre information 432, reproduction time 433, content details information 435, and 3D-related information 434. The title 431 indicates a video content title, for example, "Movie 1". The genre information 432 is information about video content type. It describes, for example, classification information such as "Movie—Foreign/comedy" using classification name or genre code. The reproduction time 433 indicates video content reproduction time. The content details information 435 provides detailed information about content, for example, outline, cast, and director.

The 3D-related information 434 includes 3D/2D mixed state information 4341, 3D video format 4342, and number of viewpoints 4343.

The 3D/2D mixed state information 4341 indicates whether video content includes both 3D video and 2D video. For example, when video content is entirely composed of 3D video, the 3D/2D mixed state information 4341 indicates "f3d" and, when video content partly includes 3D video, it indicates "p3d". Thus, the 3D/2D mixed state information 4341 indicates whether 3D video and 2D video are mixed in video content. When video content is entirely composed of 2D video, the content metadata does not include the 3D-related information 434. Alternatively, instead of omitting the 3D-related information 434, the content metadata may include the 3D-related information 434 indicating "f2d". This clearly indicates that the video content is entirely composed of 2D video.

The 3D video format 4342 indicates the 3D video format used in video content. It indicates "SBS" when video content includes 3D video based on "Side by Side format" or indicates "MVC" when video content includes 3D video based on "MVC (Multiview Video Coding) format". Thus, the 3D video format 4342 is information to identify the 3D video format used in video content.

The number of viewpoints 4343 indicates the number of viewpoints used for the 3D video included in video content. It indicates "2" when the number of viewpoints used for video content is 2 or "3" when the number of viewpoints used for video content is 3. Thus, the number of viewpoints 4343 is information indicating the number of viewpoints used for video content.

When the 3D video format used in video content is "Side by Side format", the number of viewpoints is fixed at "2", so that the number of viewpoints 4343 need not be included in the 3D-related information 434. Even if the number of viewpoints 4343 is included in the 3D-related information 434, it need not be referred to.

In cases where the 3D video format used in video content is "MVC (Multiview Video Coding) format" but the number of viewpoints 4343 is not included in the 3D-related information 434, the number of viewpoints used for the video content may be assumed to be "2", i.e. a minimum number.

The 3D-related information 434 is included in the content metadata 430 only when video content is entirely or partly compatible with 3D video. When video content is compatible only with 2D video, the 3D-related information 434 is not included in the content metadata data 430.

Other information than described above may also be included in the content metadata 430 as required.

Figure 34:
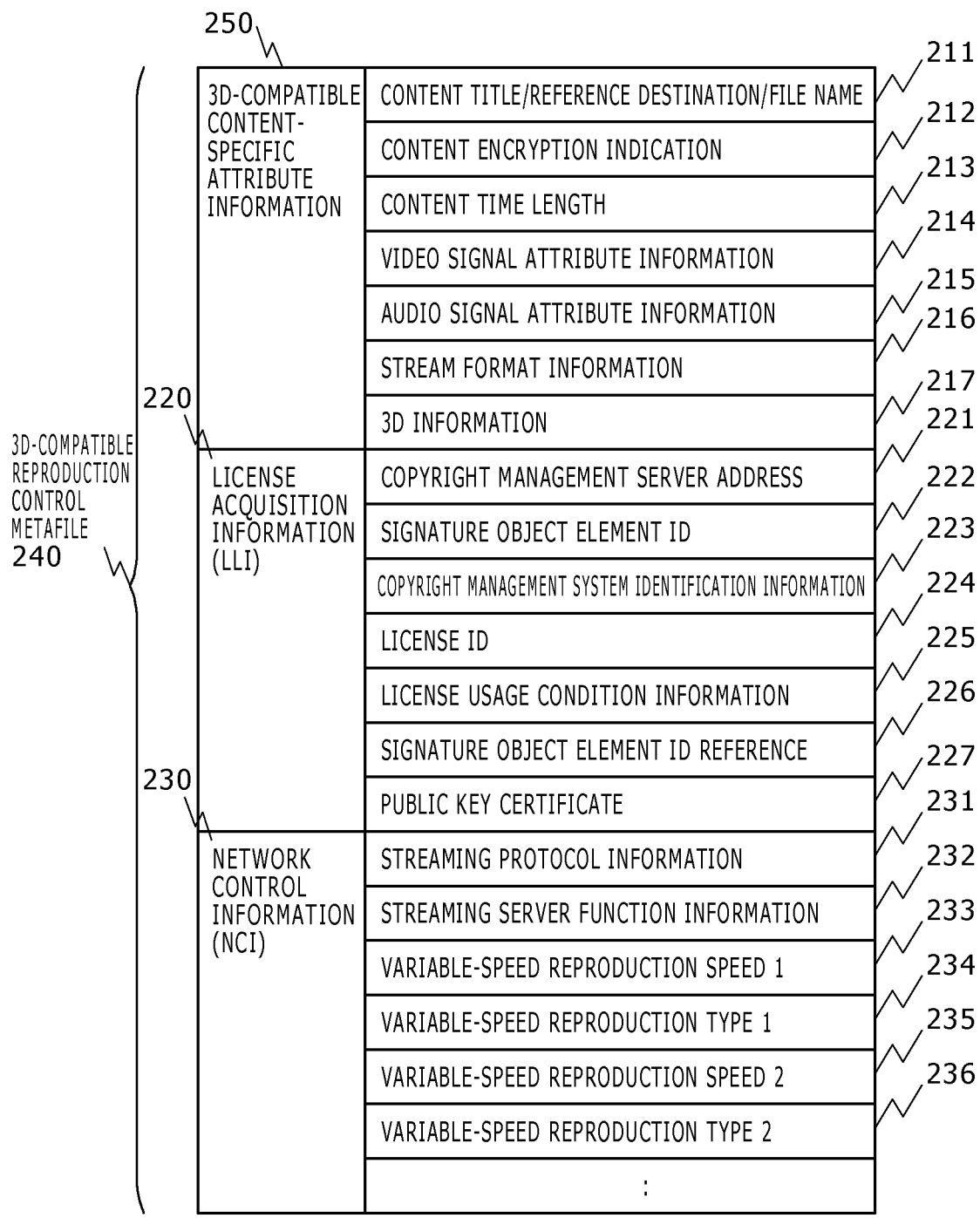
FIG. 34 shows an example of composition of reproduction control metafile 240 according to the fourth embodiment.

FIG. 34 shows an example of composition of the 3D-compatible reproduction control metafile 240 of the present embodiment.

The 3D-compatible reproduction control metafile 240 is an expansion of the reproduction control metafile 200 of the first embodiment. Of the fields of the 3D-compatible reproduction control metafile 240, those numbered identically to the fields of the reproduction control metafile 200 of the first embodiment are the same as the corresponding ones of the reproduction control metafile 200 of the first embodiment. The 3D-compatible content-specific attribute information 250 is an expansion of the content-specific attribute information 210 and additionally includes stream format information 216 indicating a video stream format and video stream 3D information 217.

The 3D information 217 may be a simple flag to indicate whether or not video stream includes 3D video. Or, it may include 3D video format information indicating the 3D video format, for example, Side by Side or MVC, used in video content and 2D/3D stream composition information indicating whether the video content is entirely composed of 3D video, or, in cases where the video content is partly composed of 3D video, whether the video content begins with 2D video or it begins with 3D video.

Figure 35:
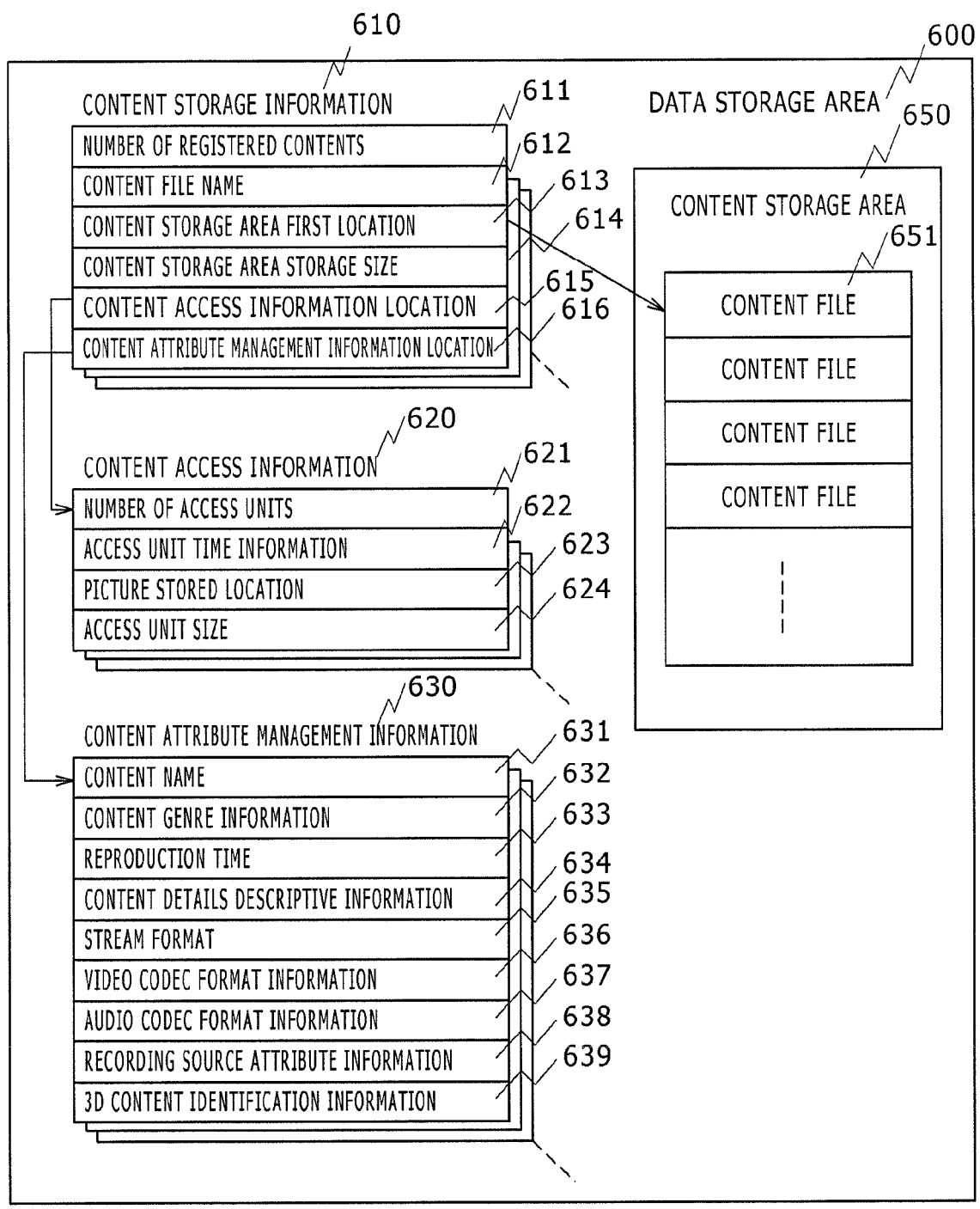
FIG. 35 shows an example of composition of data storage area 600 of a removable medium according to the fourth embodiment.

FIG. 35 shows an example of composition of a data storage area 600 of a removable medium for recording video content. The removable medium has a file system and holds the information listed in FIG. 33 as files to be managed in the file system.

Video content is recorded as content files 651 in a content storage area 650. When recording the content files 651: also recording content storage information 610 makes it possible to access the content files 651 in the content storage area 650; and also recording content access information 620 makes it possible to quickly locate an image at a midway point of specific video content. Furthermore, recording content attribute management information 630 makes it possible to search for video content recorded on the removable medium according to various search conditions.

The number of video content recorded on the removable medium is stored as the number of registered contents 611 included in the content storage information 610. The content storage information 610 includes the following information about each of the video content recorded on the removable medium.

Content file name 612 indicates a content file name managed in the file system on the removable medium. Content storage area first location 613 indicates the first storage location of the content file 651 in the content storage area 650. Content storage area storage size 614 indicates the size of the content file 651 in the content storage area.

Content access information location 615 provides information for accessing the content access information 620 about the corresponding video content. Content attribute management information location 616 provides information for accessing the content attribute management information 630 about the corresponding content.

There are cases in which the content storage information 610 includes, in addition to the above information, unique management information depending on the management system of the removable medium.

The content access information 620 includes number of access units 621 indicating, for each video content, the number of access units included, each being locatable as a reproduction starting picture. The content access information 620 also includes the following information about each access unit.

Access unit time information 622 indicates the reproduction time required to reproduce the video content from its beginning. Picture stored location 623 indicates the picture location relative to the beginning of the content file 651. Access unit size 624 indicates the data size of each access unit. When starting reproduction in accordance with user's operation, the receiver 50 searches the access unit time information 622 for the time closest to the time of the picture to be located, then reads out the access unit at the corresponding picture stored location 623 from the content file 651 so as to start reproduction from the access unit.

There are cases in which the content access information 620 includes, in addition to the above information, unique management information depending on the management system of the removable medium.

The content attribute management information 630 has the following information for each video content.

Content name 631 holds a character string representing the title of the video content. Content genre information 632 indicates a video content classification name or classification code.

Reproduction time 633 indicates the reproduction time required for the video content. Content details descriptive information 634 provides various information about the video content, for example, description, cast and director.

Stream format 635 indicates, for example, the stream file format of the video content and the composition of constituent elements such as video, audio and subtitles. Video codec format information 636 indicates the video codec format applied to the video content. Audio codec format information 637 indicates the audio codec format.

Recording source attribute information 639 provides information about the source of the video content, allowing the user to know whether the source of the video content is, for example, recording of a digital terrestrial or satellite broadcast, content downloaded from the Internet, or recording of a digital cable TV broadcast.

3D content identification information 639 is information indicating whether the video content includes 3D video. There may be cases in which the 3D content identification information 639 indicates only whether or not the video content includes 3D video or there may also be cases in which, when the video content includes 3D video, whether the video content is entirely composed of 3D video or it is only partly composed of 3D video is indicated.

Also, there may be cases in which the 3D content identification information 639 is included in the video codec format information 636 or in the stream format 635.

There are cases in which the content attribute management information 630 includes, in addition to the above information, unique management information depending on the management system of the removable medium.

Figure 36:
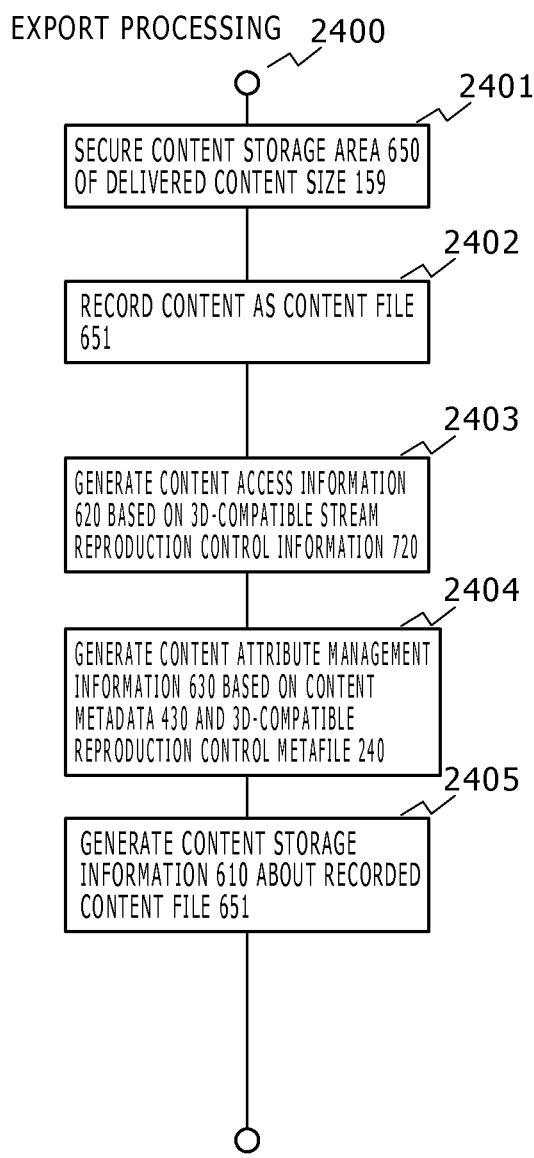
FIG. 36 is an example process flow diagram for export processing 2400 according to the fourth embodiment.

With reference to FIG. 36, an example of export processing 2400 performed by the stream output processing unit 57 in step 2213 and 2214 for export processing shown in FIG. 23 and FIG. 24 will be described in detail.

When video content is to be recorded on a removable medium, first, based on the delivered content size 159, a content storage area 650 where the video content can be stored is secured (2401), then the video content is recorded as a content file 651 in the content storage area 650 (2402).

Next, based on the 3D-compatible stream reproduction control information 720, the content access information 620 is generated and recorded (2403). Subsequently, based on the content metadata 430 and the 3D-compatible reproduction control metafile 240, the content attribute management information 630 is generated and recorded (2404). Finally, the content storage information 610 about the recorded content file 651 is generated and recorded (2405), completing the content export.

It is desirable to make sure, as in step 2401, that the remaining storage capacity of the removable medium is enough to store the content to be recorded and secure a recording area. Depending on the receiver 50 and the content service to be used, however, the content to be recorded may be exported to the removable medium without securing a recording capacity beforehand, then, should a capacity shortage occur, the content export may be discontinued.

Also, depending on the type of the removable medium, the video content received may be exported to the removable medium after transcoding the video content into a format recordable on the removable medium. At this time, the size of the video content may change from the delivered content size 159. In such a case, the content storage area 650 may be secured based on the video content size estimated according to the contents of transcoding processing.

In the transcoding referred to above, the stream format and the video and audio codec formats of the video content can be converted into different formats and the encoding bit rate can be changed.

The time information 622, picture stored location 623 and access unit size 624 included in the content access information 620 are generated by converting the access unit location information 520 included in the 3D-compatible stream reproduction control information 720 so as to make them compatible with the file system management format specific to the export-destination medium.

Also, instead of using the 3D-compatible stream reproduction control information 720, the content access information 620 may be generated by directly analyzing the video stream itself and determining the location of the content access unit.

Regarding the content attribute management information 630, the data for use in searching for and extracting content, such as the content name 631, content genre information 632, reproduction time 633, and content details descriptive information 634 are entered based on the corresponding information such as the title information 431, genre information 432, reproduction time 433, and content details information 435 included in the content metadata 430.

The content metadata 430 stipulated on the delivery service side and the content attribute management information 630 stipulated on the removable medium side do not necessarily exactly match as to data format and classification. In such a case, the data format is to be changed according to the format used on the recording medium and, when the methods of data classification used on the two sides do not match, data values agreeing, as much as possible, with those provided in the original content metadata 430 are to be entered in the content attribute management information 630.

The stream format 635, video codec format information 636 and audio codec format information 637 can be generated by analyzing relevant information included in the content-specific attribute information (ERI) 210 that is included in the 3D-compatible reproduction control metafile 240 and the video stream itself.

The 3D content identification information 639 is to be described based on the 3D-compatible reproduction control metafile 240 and the 3D-compatible stream reproduction control information 720. When the information to be described does not exactly match the corresponding information in the 3D-compatible reproduction control metafile 240 and the 3D-compatible reproduction control information 720, the closest values are to be entered.

For example, assume that the 3D-compatible content identification information 639 has flag information to indicate whether or not content includes 3D video and that the 3D information 217 included in the 3D-compatible reproduction control metafile 240, based on which the 3D-compatible content identification information 639 is to be described, has one of three values representing three states, i.e. the video content is fully composed of 3D video, the video content is partly composed of 3D video with the head portion of the video content composed of 3D video, and the video content is partly composed of 3D video with the head portion of the video content composed of 2D video. In such a case, the 3D content identification information 639 may be set to a value representing that the video content includes 3D video. When the 3D information 217 does not exist, the video content may be determined to include no 3D video and the 3D content identification information 639 may be set to a value representing that the video content does not include 3D video.

In the above embodiment, the video content may be encrypted content. When the video content is to be encrypted, the encryption method described in connection with the second and the third embodiment with reference to FIGS. 20, 26, and 27 is to be applied.

According to the above embodiment, when exporting downloaded content including 3D video to, for example, a removable medium, 3D-related information accompanying the original video content can be converted, in a manner to make the most of the information, into management information for the removable medium. This improves convenience in searching for, extracting and reproducing 3D video content on the removable medium.

The present embodiment is advantageous in that, when a removable medium storing content including 3D video is connected to another reproduction device which happens to be incapable of 3D video reproduction, it is possible to take an appropriate measure by referring to the management information stored in the removable medium, for example, indicating no content including 3D video, indicating content including 3D video as unreproducible content, or, when an attempt is made to reproduce content including 3D video, displaying an error or alarm message to the effect that the content cannot be reproduced.

Also, according to the present embodiment, when an external medium is connected to another reproduction device which cannot reproduce 3D video, a message to that effect can be displayed for the user.

The present invention is not limited to the above embodiments and is inclusive of various modifications. The above embodiments have been described in detail to make the present invention easily understandable, and the present invention is not necessarily defined to be configured entirely as described above. It is also possible to partly replace a configuration of an embodiment with a configuration of another embodiment or to add to a configuration of an embodiment a configuration of another embodiment. Also, a part of configuration of each embodiment may be added to by another configuration or may be deleted or replaced by another configuration.

It is possible to realize by hardware all or part of the above configurations, functions, processing units, and processing means, for example, by designing them as integrated circuits. Also, it is possible to realize the above configurations and functions by software, for example, by having a processor interpret and execute programs for realizing the respective functions. Such information as the programs, tables, and files for realizing the respective functions may be placed in a recording device, for example, a memory, a hard disk, or an SSD (Solid State Drive) or on a recording medium, for example, an IC card, an SD card, or a DVD.

As for control lines and information lines, not all such lines used in products have been shown, and only those considered necessary for illustrative purposes have been shown. It may be assumed that, in reality, almost all configurations are interconnected.

LIST OF REFERENCE SIGNS

50 Receiver
51 Browser
52 ECG processing unit
53 AV player
55 Downloader
56 Local navigation
57 Stream output control unit
60 Delivery system
100 Download control information
240 3D-compatible reproduction control metafile
300 License
400 ECG metadata
430 Content metadata
510 Storage
560 Removable medium
570 Network connected device
600 Data storage area
610 Content storage information
520 Content access information
630 Content attribute management information
650 Content storage area
700 3D-compatible download control information
720 3D-compatible stream reproduction control information
2400 Export processing

The invention claimed is:
1. A content receiver, comprising:
a download control unit that receives, via a network, video content and reproduction control information for use in reproducing and outputting the video content; and
an output control unit that exports the received video content to a removable storage medium, wherein, when outputting the video content to the removable storage medium, the output control unit records, based on first 3D video information delivered being included in the reproduction control information and indicating a state of 3D video existence in the video content, second 3D video information indicating whether the video content includes 3D video in management information of the removable storage medium for recording the video content.

2. The content receiver according to claim 1,
wherein, when classifications in the second 3D video information are higher in abstraction level than classifications in the first 3D video information, the output control unit records, on the removable storage medium, classifications in the second 3D video information most similar to classifications in the first 3D video information.

3. The content receiver according to claim 1,
wherein the first 3D video information holds information distinguishing whether the video content includes no 3D video or the video content is entirely composed of 3D video or the video content is partly composed of 3D video and the second 3D video information can record information as to whether 3D video is included in the video content, and
wherein, when the first 3D video information indicates either that the video content is entirely composed of 3D video or that the video content is partly composed of 3D video, the output control unit records, on the removable storage medium, information included in the second 3D video information and indicating that the video content includes 3D video.

4. A content information output method used in a content receiver, the content receiver including a download control unit that receives, via a network, video content and reproduction control information for use in reproducing and outputting the video content; and an output control unit that outputs the received video content from the content receiver to a removable storage medium, the method comprising:
when outputting the video content to the removable storage medium, the output control unit outputting to the removable storage medium, based on first 3D video information included in the reproduction control information and indicating a state of 3D video existence in the video content, second 3D video information indicating whether the video content includes 3D video as management information for the removable storage medium for recording the content.

5. The content information output method according to claim 4, comprising:
when classifications in the second 3D video information are higher in abstraction level than classifications in the first 3D video information, the output control unit outputting, to the removable storage medium, classifications in the second 3D video information most similar to classifications in the first 3D video information.

6. The content information output method according to claim 4,
the first 3D video information holding information distinguishing whether the video content includes no 3D video or the video content is entirely composed of 3D video or the video content is partly composed of 3D video, and the second 3D video information being capable of recording information as to whether 3D video is included in the video content, the method comprising:
when the first 3D video information indicates either that the video content is entirely composed of 3D video or that the video content is partly composed of 3D video, the output control unit outputting, to the removable storage medium, information included in the second 3D video information and indicating that the video content includes 3D video.

* * * * *